United States Patent
Nakanishi et al.

(10) Patent No.: US 9,383,440 B2
(45) Date of Patent: Jul. 5, 2016

(54) RADAR APPARATUS AND SIGNAL PROCESSING METHOD

(71) Applicant: FUJITSU TEN LIMITED, Kobe-shi, Hyogo (JP)

(72) Inventors: Yayoi Nakanishi, Kobe (JP); Seiji Kawabe, Kobe (JP); Masayuki Kishida, Kobe (JP); Shinya Aoki, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 191 days.

(21) Appl. No.: 14/060,281

(22) Filed: Oct. 22, 2013

(65) Prior Publication Data

US 2014/0118186 A1    May 1, 2014

(30) Foreign Application Priority Data

Oct. 30, 2012  (JP) ................................. 2012-238677
Jun. 18, 2013  (JP) ................................. 2013-127090

(51) Int. Cl.
| | |
|---|---|
| *G01S 13/34* | (2006.01) |
| *G01S 13/42* | (2006.01) |
| *G01S 13/86* | (2006.01) |
| *G01S 13/93* | (2006.01) |
| G01S 7/35 | (2006.01) |

(52) U.S. Cl.
CPC ............... *G01S 13/345* (2013.01); *G01S 13/42* (2013.01); *G01S 13/867* (2013.01); *G01S 13/931* (2013.01); G01S 2007/356 (2013.01); G01S 2013/935 (2013.01); G01S 2013/9325 (2013.01); G01S 2013/9346 (2013.01); G01S 2013/9353 (2013.01); G01S 2013/9375 (2013.01); G01S 2013/9378 (2013.01); G01S 2013/9385 (2013.01)

(58) Field of Classification Search
CPC ...... G01S 13/345; G01S 13/42; G01S 13/867; G01S 13/931; G01S 2007/356; G01S 2013/9325; G01S 2013/9375; G01S 2013/9378; G01S 2013/9385
USPC .......................................................... 342/128
See application file for complete search history.

(56) References Cited

U.S. PATENT DOCUMENTS

| | | | |
|---|---|---|---|
| 2003/0117312 A1* | 6/2003 | Nakanishi | ................ G01S 7/35 342/70 |
| 2004/0246167 A1* | 12/2004 | Kumon et al. | ................. 342/70 |

FOREIGN PATENT DOCUMENTS

JP    A-2012-103118    5/2012

* cited by examiner

*Primary Examiner* — Timothy A Brainard
(74) *Attorney, Agent, or Firm* — Oliff PLC

(57) ABSTRACT

There is provided a radar apparatus. An extracting unit extracts a peak signal obtained from a difference frequency between a transmitting signal and a receiving signal during a first period in which the frequency of the transmitting signal ascends and a second period in which the frequency descends. A pairing unit pairs the peak signals of the first and second periods based on a predetermined condition. A deriving unit derives target information including a position of a target based on paired data obtained by pairing the peak signals. The pairing unit selects normal-paired data which is paired in a correct combination, from among the plurality of paired data, based on a plurality of parameter values of the peak signals of the first and second periods which are to be paired, and a discrimination function for discriminating true or false of the pairing.

13 Claims, 26 Drawing Sheets

FIG. 11

| PAIRED DATA / DISCRIMINA-TION SCORE | Pud1 | Pud2 | Pud3 | Pud4 |
|---|---|---|---|---|
| PRE-CORRECTION SCORE | -1.3 | +0.2 | +0.7 | -3.2 |
| POST-CORRECTION SCORE | +1.7 | -2.8 | +3.7 | -6.2 |

| AVERAGE PEAK POWER [dB] | LESS THAN -55, -45 OR MORE | LESS THAN -45, -35 OR MORE | LESS THAN -35, -25 OR MORE |
|---|---|---|---|
| RANGE OF REGION | -3.5 OR MORE, LESS THAN 0 (REGION WIDTH 3.5) | -2 OR MORE, LESS THAN +1 (REGION WIDTH 3.0) | +1 OR MORE, LESS THAN +2.5 (REGION WIDTH 1.5) |

RADAR APPARATUS AND SIGNAL PROCESSING METHOD

CROSS-REFERENCE TO RELATED APPLICATIONS

This application is based on and claims priority from Japanese Patent Application No. 2012-238677 filed on Oct. 30, 2012 and Japanese Patent Application No. 2013-127090 filed on Jun. 18, 2013.

TECHNICAL FIELD

The present invention relates to signal processing for derivation of a target.

BACKGROUND

In the past, a vehicle-mounted radar apparatus derives a position of a target with respect to a vehicle (radar apparatus) by transmitting a transmission wave from a transmitter antenna and receiving a reflection wave from the target by a receiver antenna. The detailed process thereof is as follows. A signal processing unit of the radar apparatus generates a beat signal by mixing a transmitting signal corresponding to the transmission wave of which a frequency is changed in a given period, and a receiving signal corresponding to the reflection wave. That is, the signal processing unit generates the beat signal based on a frequency difference (beat frequency) between the transmitting signal and the receiving signal in each period including an up period in which the frequency ascends in a predetermined period, and a down period in which the frequency descends in a predetermined period.

Then, the signal processing unit generates a signal (hereinafter referred to as a transformed signal) for every frequency by processing the beat signal through FFT (Fast Fourier Transform). Among the transformed signals, a signal exceeding a threshold of a predetermined signal level is extracted as a peak signal. The signal processing unit derives paired data by pairing the peak signal of the up period and the peak signal of the down period based on a given condition.

The signal processing unit derives a distance (hereinafter referred to a vertical distance) from the vehicle to the target, or a distance (hereinafter referred to as a horizontal distance) of the target with respect to a vehicle running in a direction substantially perpendicular to a traveling direction of the vehicle. Further, the signal processing unit derives a relative speed of the target with respect to the vehicle. In this way, the signal processing unit derives the position of the target including the vertical and horizontal distances of the target, and the relative speed, based on the pair data which is subjected to the pairing process.

The signal processing unit outputs information (hereinafter referred to as target information) about the target, including the position of the target and the relative speed of the target, to a vehicle control device for controlling a behavior of the vehicle. As a result, the vehicle control device performs necessary vehicle control according to the target information outputted from the radar apparatus.

If a plurality of targets exist around the vehicle and the receiver antenna simultaneously receives reflection waves from the plurality of targets, a plurality of peak signals are extracted from a frequency axis in the up and down periods after the FFT processing is performed. Further, as well as the peak signals corresponding to the targets, a signal resulted from a noise also appears individually in the vicinity of a frequency of the plurality of peak signals. If the signal resulted from the noise exceeds the threshold, it is extracted as a peak signal. In the case where a plurality of peak signals exist on the frequency axis of the up and down periods, there is a possibility which satisfies a desired condition where paired data (hereinafter referred to as mis-paired data) obtained by pairing a combination of peak signals not in a correct manner but in a wrong manner is regarded as paired data (hereinafter referred to as normal-paired data) obtained by pairing a combination of peak signals in the correct manner. If the mis-paired data is derived, wrong target information different from actual target information is output to the vehicle control device, and the vehicle control device controls the vehicle based on the wrong object information, so that there is a possibility that necessary vehicle control cannot be carried out, or unnecessary vehicle control can be carried out. For this reason, in the case of paring the peak signals of each period, it is necessary to perform the pairing the combination in the correct manner.

As compared with the above-described method, Patent Document 1 discloses a technology in which a signal processing unit of a radar apparatus derives a Mahalanobis distance based on three parameters corresponding to each peak signal of up and down periods, and selects normal-paired data among the plurality of paired data, based on the Mahalanobis distance.

Specifically, three parameters used when the signal processing unit derives the Mahalanobis distance include a power difference (hereinafter referred to as a peak power difference) of the peak signals between the up period and the down period, an angular difference (hereinafter referred to as an angular difference) based on phase information of the peak signals between the up period and the down period, and an angular spectrum difference (hereinafter referred to as an angular power difference) based on phase information of the peak signals between the up period and the down period. And, the signal processing unit calculates a coordinate position in a three-dimensional space determined from values of these parameters in the pair data, and the Mahalanobis distance with regard to the coordinate position in the three-dimensional space set based on average parameter of the normal-paired data calculated in advance. As a result, the signal processing unit selects the paired data, of which the Mahalanobis distance is minimized, among the plurality of paired data as the normal-paired data.

Patent Document 1: Japanese Patent Application Publication No. 2012-103118A

However, in the case where the signal processing unit calculates the Mahalanobis distance, based on three parameters, to select the normal-paired data, as described above, there is a possibility that accuracy of selecting the normal-paired data is not sufficient. As one method of improving it, it is considered a method of increasing the number of parameters (e.g., three parameters are increased by four or more) to derive the Mahalanobis distance. However, since the Mahalanobis distance is calculated by matrix computation, there will be an increase in a processing load generated when the signal processing unit selects the normal-paired data if the number of the parameters is simply increased. And, since a time required for that the vehicle control device controls the vehicle based on the target information, there is a possibility of requiring a time over a required amount until the vehicle control device controls the vehicle based on the target information.

SUMMARY

It is therefore an object of the present invention to derive paired data which is obtained by pairing signals in a correct combination, without increasing a processing load of a pairing process.

(1) According to an aspect of the embodiments of the present invention, there is provided a radar apparatus comprising: an extracting unit configured to extract a peak signal obtained from a difference frequency between a transmitting signal of which a frequency is changed in a predetermined period, and a receiving signal obtained by receiving a reflection wave at which a transmission wave based on the transmitting signal is reflected from an object, during a first period in which the frequency of the transmitting signal ascends and a second period in which the frequency descends; a pairing unit configured to pair the peak signal of the first period and the peak signal of the second period based on a predetermined condition; and a deriving unit configured to derive target information including a position of a target based on paired data obtained by pairing the peak signals, wherein the pairing unit selects normal-paired data which is paired in a correct combination, from among the plurality of paired data, based on a plurality of parameter values of the peak signal of the first period and the peak signal of the second period which are to be paired, and a discrimination function for discriminating true/false of the pairing.

(2) The radar apparatus according to (1), wherein the pairing unit calculates a discrimination score indicative of a degree of true/false of the pairing of the paired data based on the plurality of parameter values and the discrimination function, and selects the normal-paired data from among the plurality of paired data by the discrimination score of the paired data.

(3) The radar apparatus according to (1) or (2), wherein the pairing unit selects the normal-paired data from among the plurality of paired data, using information on presence or absence of a past consecutive target which is a target having a temporally consecutive relation with paired data of a recent process having information on a discrimination result using the discrimination function, among the targets derived by the past process temporally consecutive with the recent process.

(4) The radar apparatus according to (3), wherein the pairing unit calculates the discrimination score indicative of the degree of true/false of the pairing of the paired data based on the plurality of parameter values and the discrimination function, and selects the normal-paired data from among the plurality of paired data using, information on whether the past consecutive target exists, in a case where the discrimination score of the paired data is within a predetermined score range.

(5) The radar apparatus according to (4), wherein the pairing unit adds the discrimination score of the paired data in which the past consecutive target exists.

(6) The radar apparatus according to (4) or (5), wherein the pairing unit subtracts the discrimination score of the paired data in which the past consecutive target does not exist, or uses the discrimination score without being changed.

(7) The radar apparatus according to any one of (1) to (6), wherein the pairing unit selects the normal-paired data from among the plurality of paired data, using information on presence or absence of an object image which is an image of an object corresponding to the paired data having information of discrimination result using the discrimination function, among images pictured by a camera.

(8) The radar apparatus according to (7), wherein the pairing unit calculates the discrimination score indicative of the degree of true/false of the pairing of the paired data based on the plurality of parameter values and the discrimination function, and selects the normal-paired data from among the plurality of paired data, using information on presence or absence of the object image, if the discrimination score of the paired data is within the predetermined score range.

(9) The radar apparatus according to (8), wherein the pairing unit adds the discrimination score of the paired data in which the object image exists.

(10) The radar apparatus according to (8) or (9), wherein the pairing unit subtracts the discrimination score of the paired data in which the object image does not exist, or uses the discrimination score without being changed.

(11) The radar apparatus according to any one of (1) to (10), further comprising: an output unit configured to output the target information based on an output condition; a region setting unit configured to set a low-reliability region having a predetermined range near a boundary to discriminate true/false of a combination of the paired data; and a change unit configured to change the output condition if the normal-paired data is included in the range of the low-reliability region.

(12) The radar apparatus according to (11), wherein the region setting unit sets the low-reliability region having a range according to a parameter value of the normal-paired data.

(13) The radar apparatus according to (12), wherein the region setting unit makes the range of the low-reliability region narrow as power of the peak signal of the normal-paired data is large.

(14) The radar apparatus according to any one of (11) to (13), wherein the change unit does not change the output condition if the normal-paired data included in the range of the low-reliability region is paired data of a target corresponding to a person.

(15) The radar apparatus according to any one of (11) to (14), wherein the output unit does not output the target information if a vertical distance of the normal-paired data included in the low-reliability region is equal to or greater than a predetermined distance.

(16) The radar apparatus according to any one of (11) to (15), wherein the change unit sets the output condition, in the case where the normal-paired data is included in the range of the low-reliability region, to a condition to delay an output than when the normal-paired data is out of the range of the low-reliability region.

(17) According to another aspect of the embodiments of the present invention, there is provided a signal processing method comprising: (a) extracting a peak signal obtained from a difference frequency between a transmitting signal of which a frequency is changed in a predetermined period, and a receiving signal obtained by receiving a reflection wave at which a transmission wave based on the transmitting signal is reflected from an object, during a first period in which a frequency of the transmitting signal ascends and a second period in which the frequency descends; (b) pairing the peak signal of the first period and the peak signal of the second period based on a predetermined condition; and (c) deriving target information including a position of a target based on paired data obtained by pairing the peak signals, wherein in the step (b), normal-paired data which is paired in a correct combination is selected from among the plurality of paired data, based on a plurality of parameter values of the peak signal of the first period and the peak signal of the second period which are to be paired, and a discrimination function for discriminating true/false of the pairing.

According to the aspects set forth in (1) to (17), since the normal-paired data is selected by the discrimination function and the plurality of parameter values of the peak signals, a processing load in the pairing process of the signal processing unit can be decreased, and the correct pairing can be performed.

According to the aspect set forth in (2), since the normal-paired data is selected from the plurality of paired data by the discrimination score, it is possible to select the paired data of the correct combination in a quantitative way.

According to the aspect set forth in (3), since the normal-paired data is selected according to the presence or absence of the past consecutive target having a temporally consecutive relation with the paired data of the recent process, even in the case where the selection of the normal-paired data is difficult only using the discrimination function, it is possible to perform the more correct pairing based on the target information of the past process.

According to the aspect set forth in (4), since the process of selecting the normal-paired data is performed using the information on the presence or absence of the past consecutive target in a case where the discrimination score of the paired data is within the predetermined score range, it is possible to decrease the processing load in the pairing process of the signal processing unit, in comparison to a case of performing the process of always selecting the normal-paired data using information on the presence or absence of the past consecutive target.

According to the aspect set forth in (5), since the discrimination score of the paired data, in which the past consecutive target exists, is added, the paired data having the possibility of the correct combination can be selected based on more quantitative information.

According to the aspect set forth in (6), since the discrimination score of the paired data, in which the past consecutive target does not exist, is subtracted or is used without being changed, the paired data having the possibility of the wrong combination can be selected based on more quantitative information.

According to the aspect set forth in (7), since the normal-paired data is selected using the information on the presence or absence of the object image of the object corresponding to the paired data, even in the case where the selection of the normal-paired data is difficult only using the discrimination function, it is possible to perform the more correct pairing based on the information of the device different from the radar apparatus.

According to the aspect set forth in (8), since the process of selecting the normal-paired data is performed using the information on the presence or absence of the past consecutive target in the case where the discrimination score of the paired data is within the predetermined score range, it is possible to decrease the processing load in the pairing process of the signal processing unit, in comparison to the case of performing the process of selecting the normal-paired data using the information on the presence or absence of the object image with respect to all paired data.

According to the aspect set forth in (9), since the discrimination score of the paired data, in which the object image corresponding to the paired data of the current process exists, is added, the paired data having the possibility of the correct combination can be selected based on the more quantitative information.

According to the aspect set forth in (10), since the discrimination score of the paired data, in which the object image corresponding to the paired data of the current process does not exist, is subtracted or is used without being changed, the paired data having the possibility of the wrong combination can be selected based on the more quantitative information.

According to the aspect set forth in (11), if the normal-paired data is included in the range of the low-reliability region, since the output condition is changed, it is possible to suppress the output of the target information which is paired in the wrong combination, and to early output the target information which is paired in the correct combination.

According to the aspect set forth in (12), since the low-reliability region having the range corresponding to the parameter value of the normal-paired data is set, it is possible to set the range of the low-reliability region corresponding to the reliability in the combination of the peak signal of the up period and the peak signal of the down period of the normal-paired data.

According to the aspect set forth in (13), since the range of the low-reliability region becomes narrow as the power of the peak signal of the normal-paired data is large, the process can be performed without including the normal-paired data having the high reliability of the pairing of the normal-paired data in the range of the low-reliability region.

According to the aspect set forth in (14), since the change unit does not change the output condition if the normal-paired data included in the range of the low-reliability region is the paired data of the target corresponding to the person, it is possible to early output the target information on the target corresponding to the person.

According to the aspect set forth in (15), since the output unit does not output the target information if the vertical distance of the normal-paired data included in the low-reliability region is above the predetermined distance, the radar apparatus can decrease the processing load, without performing the process of the target, by which the output is not necessary.

According to the aspect set forth in (16), since the output condition that the normal-paired data is included in the range of the low-reliability region is set to the condition to delay the output than when the normal-paired data is out of the range of the low-reliability region, the precision in the judgment of the true/false of the normal-paired data having the possibility of pairing the data in the wrong combination is improved.

BRIEF DESCRIPTION OF THE DRAWINGS

In the accompanying drawings:

FIG. 11 is a diagram illustrating a discrimination score calculated based on the discrimination function, and a discrimination score corrected by presence or absence of a past consecutive target of the paired data after discrimination;

DETAILED DESCRIPTION OF THE EMBODIMENTS

Hereinafter, embodiments of the present invention will now be described with reference to the accompanying drawings. It should be noted that the technical scope of the present invention is not limited to embodiments described herein, but it is defined by the appended claims and their equivalents.

First Embodiment

1. Configuration

<1-1. View of Overall Vehicle>

Figure 1:
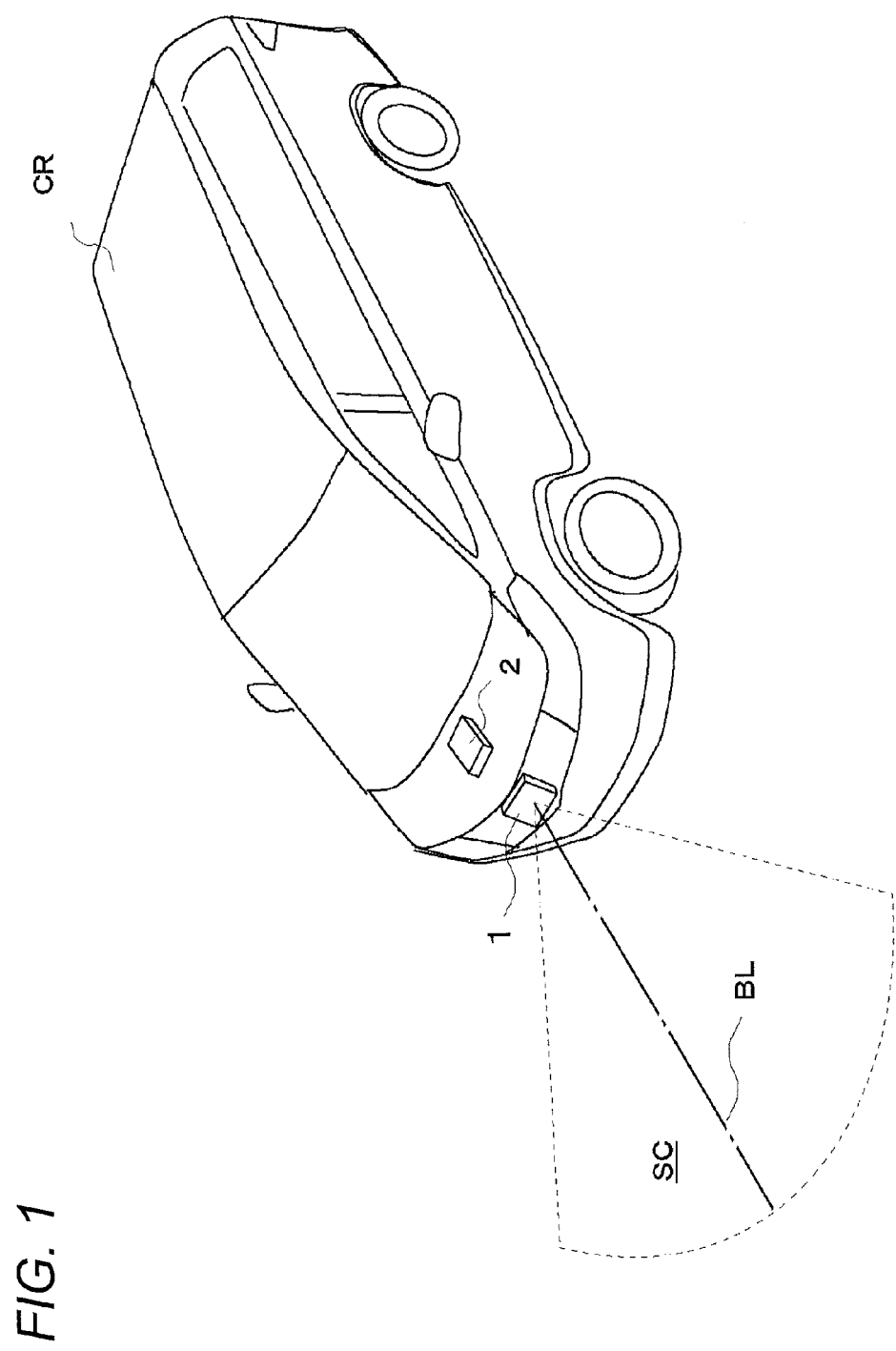
FIG. 1 is a diagram of an overall vehicle.

FIG. 1 is a view of an overall vehicle CR. The vehicle CR usually includes a radar apparatus 1 and a vehicle control device 2 which are provided in a vehicle control system 10 according to this embodiment. The radar apparatus 1 is installed at a front portion of the vehicle CR. The radar apparatus 1 scans a scanning scope SC through once scanning to derive a vertical distance, which is a distance between the vehicle CR and a target, corresponding to a traveling direction of the vehicle CR. Also, the radar apparatus 1 derives a horizontal distance, which is a distance between the vehicle CR and the target, corresponding to a horizontal direction of the vehicle CR. Meanwhile, the horizontal direction is derived by use of information on an angle of the target with respect to the vehicle CR. In this way, the radar apparatus 1 derives a position of the target including the vertical distance and the horizontal distance of the target with respect to the vehicle CR. Further, the radar apparatus 1 derives a relative speed which is a speed of the target with respect to the speed of the vehicle CR.

On the other hand, a mount position of the radar apparatus 1 in FIG. 1 is the front portion in front of the vehicle, but it is not limited to the front portion in front of the vehicle. As long as the position reaches the target according to a purpose of controlling the vehicle CR by the vehicle control device 2 which will be described later, other mount position, such as a rear front portion of the vehicle CR or a side mirror of a lateral portion of the vehicle CR, is possible.

The vehicle CR includes the vehicle control device 2 in the vehicle CR. The vehicle control device 2 is an ECU (Electronic Control Unit) for controlling each device of the vehicle Cr.

<1-2. System Block Diagram>

Figure 2:
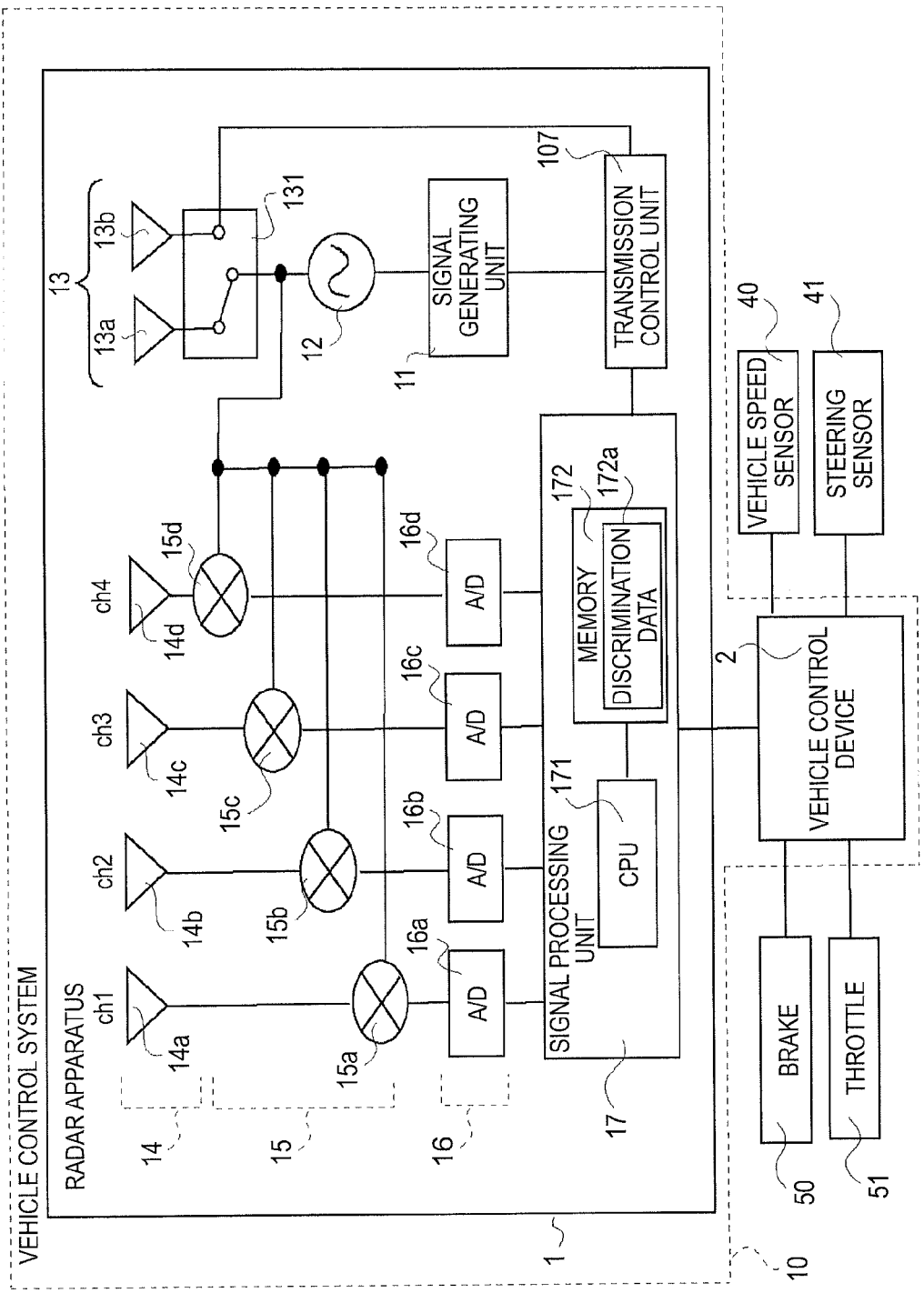
FIG. 2 is a block diagram of a vehicle control system according to a first embodiment.

FIG. 2 is a block diagram of the vehicle control system 10. The vehicle control system 10 is configured so that the radar apparatus 1 and the vehicle control device 2 are electrically connected to each other, and the target information on the position and the relative speed of the target which are usually derived from the radar apparatus is output to the vehicle control device 2. That is, the radar apparatus 1 outputs the target information including the vertical distance, the horizontal distance, and the relative speed of the target with respect to the vehicle CR to the vehicle control device 2. The vehicle control device 2 controls operation of various devices of the vehicle CR based on the target information. In addition, the vehicle control device 2 is electrically connected to various sensors provided in the vehicle CR, such as a vehicle speed sensor 40 and a steering sensor 41. Further, the vehicle control device 2 is electrically connected to various sensors provided in the vehicle CR, such as a brake 50 and a throttle 51.

The target information of the object existing around the vehicle CR of the radar apparatus 1 is as follows. The radar apparatus 1 emits a transmission wave on a frequency-modulated transmitting signal, and receives a reflection wave coming from the target at which the transmission wave is reflected, as a receiving signal, thereby deriving the target information from the receiving signal. Based on the target information derived by the radar apparatus 1, the vehicle control device 2 outputs a control signal for operating the brake 50 and adjusting opening of the throttle 51 to each unit.

Next, the configuration of the radar apparatus 1 will be described. The radar apparatus 1 generally includes a signal generating unit 11, an oscillator 12, a transmission antenna 13, a reception antenna 14, a mixer 15, an AD (Analog/Digital) converter 16, and a signal processing unit 17.

The signal generating unit 11 generates a modulation signal, for example, of which a voltage is changed in a triangular-wave shape based on a control signal of a transmission control unit 107 which will be described later.

The oscillator 12 is a voltage control oscillator for controlling an oscillation frequency with a voltage, and frequency-modulates a signal of a given frequency band (e.g., a signal of a frequency band of which a center frequency is 76.5 GHz), based on the modulated signal generated from the signal generating unit 11, to output it to the transmission antenna 13 as a transmitting signal.

The transmission antenna 13 outputs a transmitting wave relating to the transmitting signal to the outside of the vehicle. The radar apparatus 1 according to this embodiment includes two transmission antennas, that is, a transmission antenna 13a and a transmission antenna 13b. The transmission antennas 13a and 13b are switched in a predetermined period by switching of a conversion unit 131, and the transmission wave is continuously output to the outside of the vehicle from the transmission antenna 13 connected to the oscillator 12.

The conversion unit 131 is a switch for converting connection of the oscillator 12 and the transmission antenna 13, and connects the oscillator 12 and any one of the transmission antenna 13a and the transmission antenna 13b according to the signal of the transmission control unit 107.

The reception antenna 14 is a plurality of array antennas receiving a reflection wave coming from the object at which the transmission wave continuously transmitted from the transmission antenna 13 is reflected. In this embodiment, the reception antenna 14 includes four reception antennas, that is, reception antennas 14a(ch1), 14b(ch2), 14c(ch3) and 14d (ch4). Each antenna of the reception antennas 14a to 14d is arranged at a regular interval.

The mixer 15 is provided at each reception antenna. The mixer 15 mixes the receiving signal and the transmitting signal. A beat signal which is a difference between both signals, that is, the transmitting signal and the receiving signal, is generated by mixing the transmitting signal and the receiving signal, and is output to the AD converter 16.

The transmitting signal and the receiving signal which generate the beat signal will now be described by taking a signal processing method of FM-CW (Frequency Modulated Continuous Wave) as an example with reference to FIG. 3. Although the FM-CW method will be described as an example in this embodiment, the present invention is not limited to this method, and any method of deriving the target by combining a plurality of periods, such as an up period in which the frequency of the transmitting signal ascends, and a down period in which the frequency of the transmitting signal descends.

Figure 3:
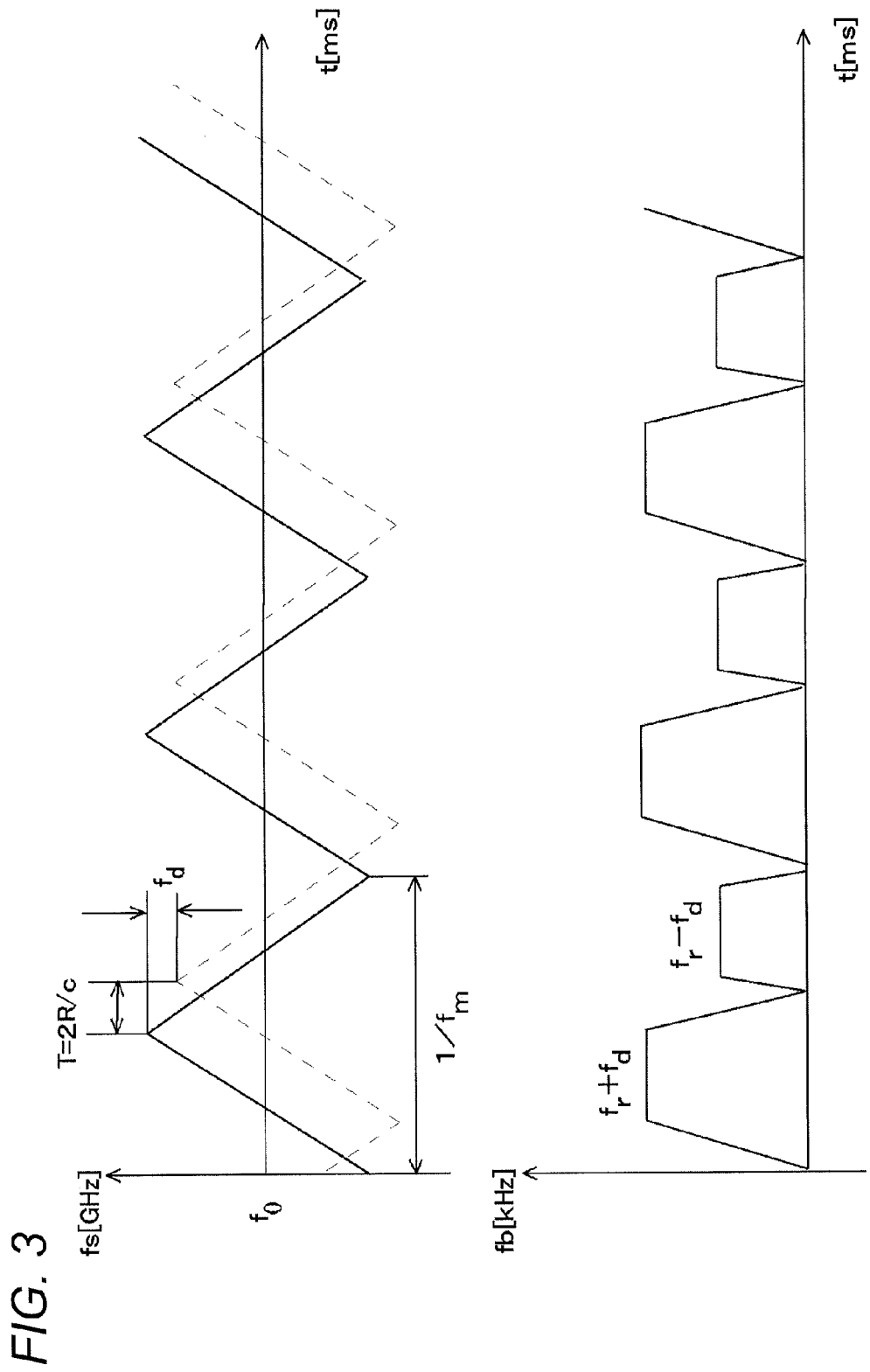
FIG. 3 is a diagram substantially illustrating waveforms of a transmitting signal and a receiving signal of a radar apparatus.

Symbols that appear in expressions described below and signals and beat frequencies of the FM-CW shown in FIG. 3 are as follows: fr: distance frequency, fd: speed frequency, Fo: center frequency of a transmission wave, ΔF: frequency deviation width, fm: repetition frequency of a modulation wave, c: speed of light (speed of a wave), T: reciprocating time of a wave between the vehicle CR and the target, fs: transmission/reception frequency, fb: beat frequency, R: vertical distance, V: relative speed, fup: beat frequency in the up period, fdn: beat frequency in the down period, θm: angle of the target, θup: angle corresponding to a peak signal in the up period, and θdn: angle corresponding to a peak signal in the down period.

<1-3, FM-CW Signal Processing>

FIG. 3 is a diagram substantially illustrating a transmitting signal and a receiving signal of the radar apparatus 1. An upper drawing in FIG. 3 shows a signal waveform of FM-CW transmitting signal and receiving signal. Further, a lower drawing in FIG. 3 shows a beat frequency that occurs by a difference frequency between the transmitting signal and the receiving signal. In the upper drawing in FIG. 3, a horizontal axis represents a time, and a vertical axis represents a frequency. In the drawing, the transmitting signal indicated by a solid line has a property where the frequency is changed in a predetermined period, and has an up period in which the frequency ascends up to a predetermined frequency and a down period in which the frequency descends to a predetermined frequency after it ascended to the predetermined frequency. The transmitting signal repeats a constant change so that it descends to the predetermined frequency and then ascends up to the predetermined frequency. Further, the receiving signal is a reflection wave at which the transmission wave outputted from the transmission antenna 13 is reflected from the object, and the reflection wave is received by the reception antenna 14 as the receiving signal as shown as a dashed line in the drawing. In the same manner as the transmitting signal, the receiving signal also has an up period and a down period.

Further, the receiving signal has a time delay (T=2R/c) in comparison to the transmitting signal depending on the vertical distance between the vehicle CR and the target. Further, if there is a speed difference between the vehicle CR and the target, the receiving signal is shifted in parallel to the axis of the frequency fs in comparison to the transmitting signal. This Doppler shift becomes fd.

In the lower drawing in FIG. 3, the beat frequency which is the difference frequency between the transmitting signal and the receiving signal in the up period, and the difference frequency between the transmitting signal and the receiving signal in the down period is represented on the assumption that the horizontal axis represents time and the vertical axis represents beat frequency.

Herein, the vertical distance of the target to the vehicle CR is calculated by Expression 1, and the relative speed of the target to the vehicle CR is calculated by Expression 2. Further, the angle of the target to the vehicle CR is calculated by Expression 3. A horizontal distance of the target to the vehicle CR is calculated by computation using a trigonometric function from the information on the vertical distance and the angle calculated by Expression 3.

[Expression 1]

$$R = \frac{(f_{up} + f_{dn}) \cdot c}{2 \times (4 \times \Delta F \times f_m)} \quad (1)$$

[Expression 2]

$$V = \frac{(f_{up} - f_{dn}) \cdot c}{2 \times (4 \times \Delta F \times f_m)} \quad (2)$$

[Expression 3]

$$\theta_m = \frac{\theta_{up} + \theta_{dn}}{2} \quad (3)$$

Returning back to FIG. 2, the AD converter 16 derives sampling data through sampling of the beat signal that is an analog signal in the predetermined period. Further, the AD converter 16 quantizes the sampled data to convert the beat signal that is the analog data into digital data, and output the digital data to the signal processing unit 17. On the other hand, in the same manner as the mixer 15, the AD converter 16 is provided for each reception antenna.

The signal processing unit 17 is a computer including a CPU 171 and a memory 172, and generates a transformed signal for every frequency by processing the beat signal outputted from the AD converter 16 through FFT. Among the plurality of transformed signals, the signal processing unit 17 extracts a peak signal exceeding a threshold of a predetermined signal level. The signal processing unit 17 generates a plurality of paired data by pairing the peak signal of the up period and the peak signal of the down period, and selects the normal-paired data which is the paired data obtained by pairing the data in a correct combination, among the plurality of paired data. Meanwhile, when the signal processing unit 17 selects the normal-paired data among the plurality of paired data, the signal processing unit selects the normal-paired data using a plurality of parameter values of the peak signal of the up period and the peak signal of the down period of the object to be subjected to the pairing, and a discrimination function of determining whether the pairing is true or false. In the pairing process, a process of selecting the normal-paired data by the signal processing unit 17 will now be described in detail.

<1-4. Selection of Normal-Paired Data>

Figure 4:
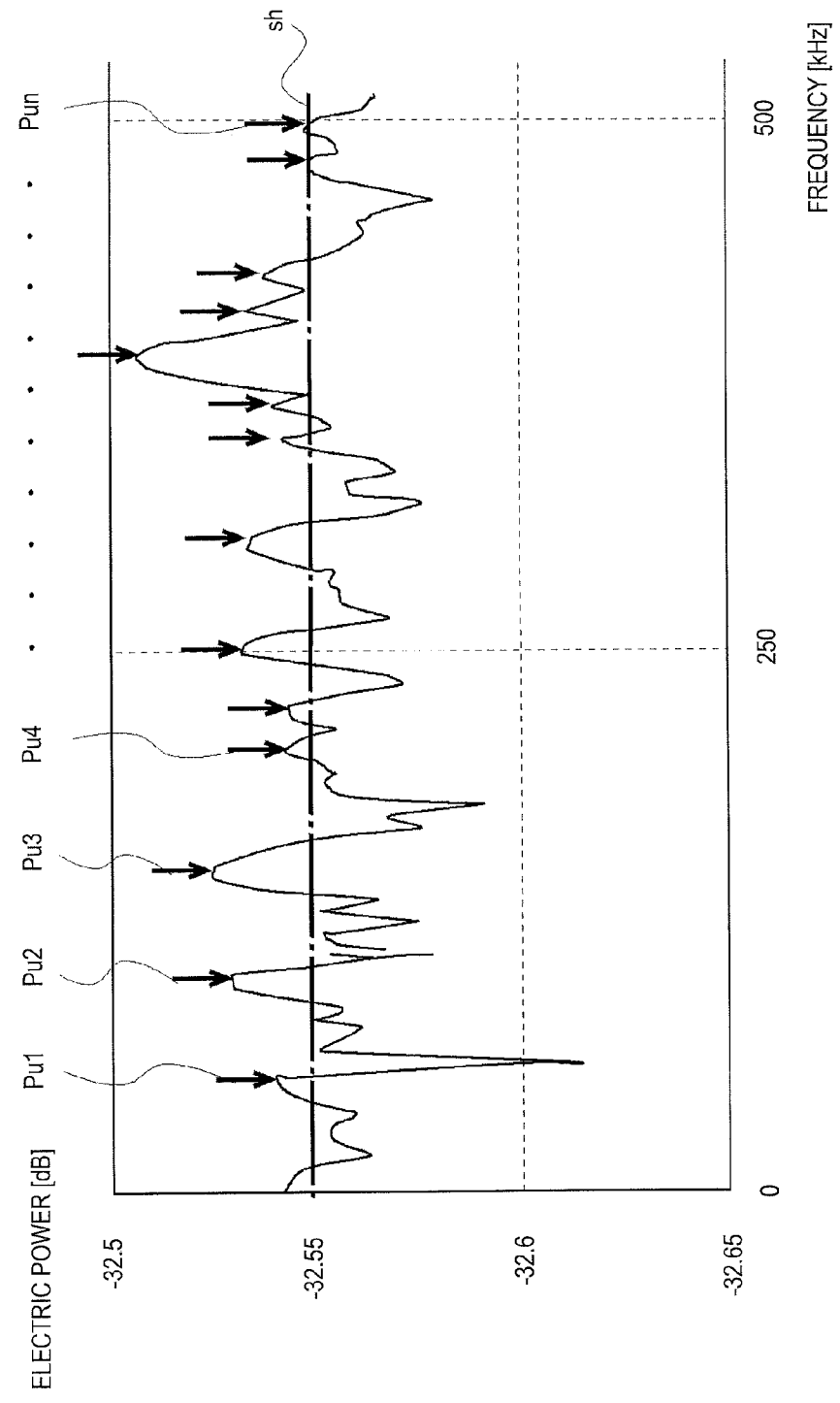
FIG. 4 is a diagram illustrating a peak signal of an up period.
Figure 5:
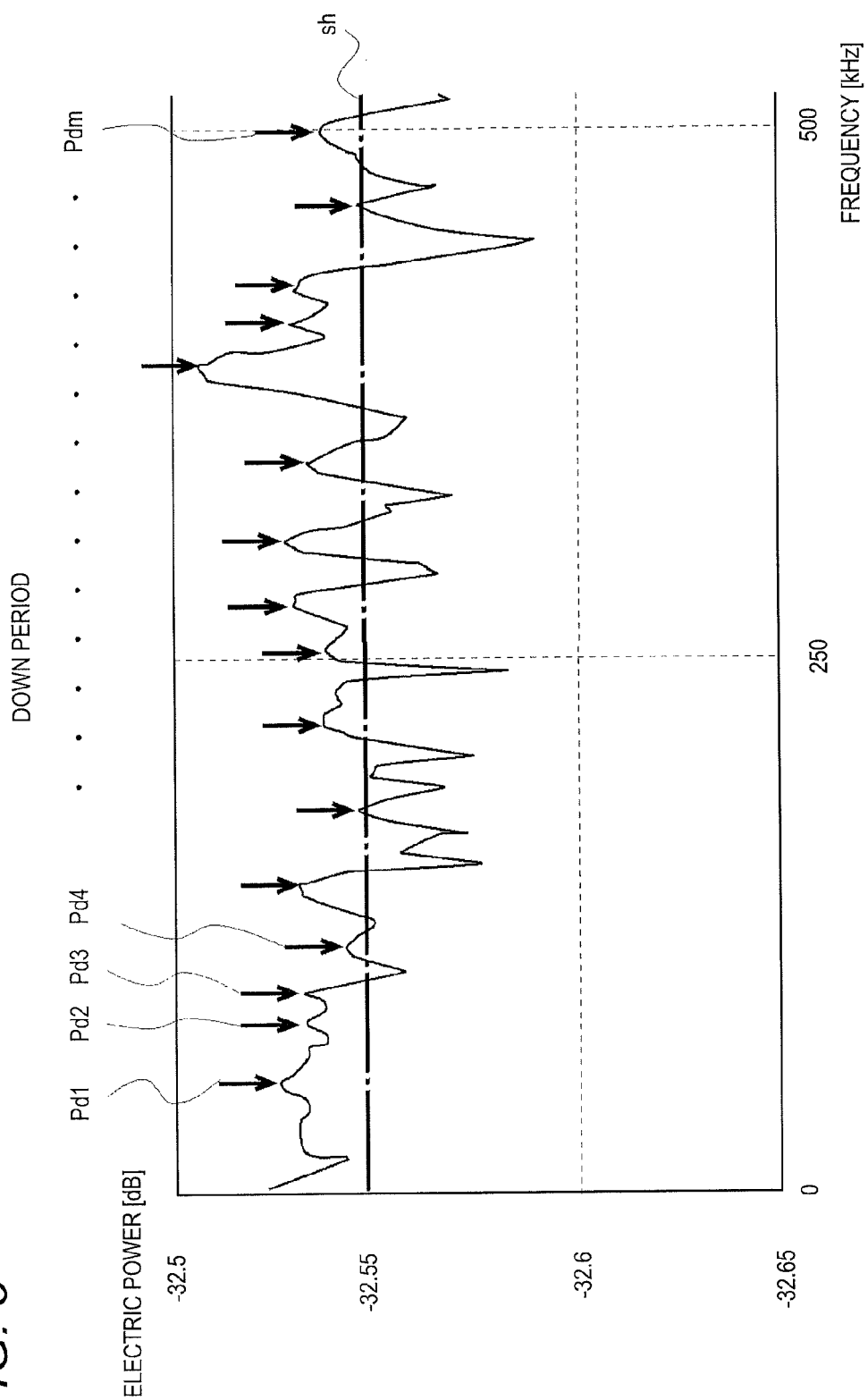
FIG. 5 is a diagram illustrating a peak signal of a down period.

FIG. 4 is a diagram illustrating the peak signal of the up period. FIG. 5 is a diagram illustrating the peak signal of the down period. In FIGS. 4 and 5, a horizontal axis represents a frequency, and a vertical axis represents an electric power, thereby illustrating the waveform of the transformed signal after FFT processing.

The signal processing unit 17 extracts a signal exceeding a threshold sh of a predetermined signal level among the transformed signals in the up period illustrated in FIG. 4, as a peak signal of the up period. For example, the signal processing unit 17 extracts a signal exceeding a threshold −32.55 dB as the peak signal (peak signals Pu1, Pu2, Pu3, Pu4 . . . Pun) of the up period. Meanwhile, the signal level uses a predetermined electric power as a reference, and has a value represented by its ratio in unit of dB.

The signal processing unit 17 extracts a signal exceeding a threshold sh among the transformed signals in the down period illustrated in FIG. 5, as a peak signal of the down period. For example, the signal processing unit 17 extracts a signal exceeding the threshold −32.55 dB as the peak signal (peak signals Pd1, Pd2, Pd3, Pd4 . . . Pdn) of the down period.

Subsequently, the signal processing unit 17 uses the peak signal of one period as a reference peak signal, and generates a plurality of paired data by individually pairing the reference peak signal and all peak signals of different periods. For example, the signal processing unit 17 uses the peak signal (e.g., peak signal Pd1) of the down period illustrated in FIG. 5, and individually generates the paired data of the peak signal Pd1 and all peak signals (peak signals Pd1, Pd2, Pd3, Pd4 . . . Pdn) of the up period.

The signal processing unit 17 calculates a discrimination score by substituting a plurality of parameter values carried by the peak signal Pd1 of the down period constituting each pair data among the plurality of paired data generated, and a plurality of parameter values carried by the peak signal (e.g., peak signal Pu1) of the up period which becomes an object to be paired in the discrimination function. The discrimination function is to determine true or false of the pairing, and the discrimination score is a value indicative of a degree of true/false of the pairing process.

The signal processing unit 17 selects the paired data having the highest discrimination score among the plurality of paired data, as the normal-paired data. In this way, the signal processing unit 17 performs the process of calculating the discrimination score using the discrimination function which is a linear function at the selection of the normal-paired data, thereby improving the precision in selection of the normal-paired data and shortening a processing time of the pairing process, in comparison to the process of calculating the Mahalanobis distance using the matrix function. As a result, it is possible to improve the precision in vehicle control of the vehicle control device 2 and also shorten the processing time.

If the process of selecting the normal-paired data using the peak signal Pd1, which is one peak signal of the down period, as the reference peak signal is terminated, the signal processing unit 17 performs the pairing of all peak signal of the up period using other peak signal (e.g., peak signal Pd2) of the down period as the reference peak signal, and then selects the normal-paired data based on the discrimination function. The signal processing unit 17 performs generation of the paired data and selection of the normal-paired data using all peak signals (peak signals Pu1, Pu2, Pu3, Pu4 . . . Pun) of the down period one by one as the reference peak signal. Although the peak signal of the down period is used as the reference peak signal in the above description, all peak signals of the down period for each reference peak signal of the up period may be the object to be pairing-processed using the peak signal of the up period as the reference peak signal.

Each peak signal of the up period and the down period has power (hereinafter referred to as peak power) of the peak signal, an angle (hereinafter referred to as a peak angle) based on the phase information of the peak signal, and angular spectrum power (hereinafter referred to as angular power) which is the angular distribution of the reflection wave obtained by an angle estimation method using an array antenna, such as a beamformer method or a Capon method, based on phase information of the peak signal. According to the angle estimation method of the target performed by the signal processing unit 17, there is a case where the angle information on the plurality of targets can be separated from one peak signal. In this instance, one peak signal has the parameters of the peak power, the peak angle, and angle power which correspond to the plurality of targets. For example, if the peak signal Pd1 of the down period and the peak signal Pu1 of the up period have three target information, respectively, the peak signal Pu1 of the up period is divided into three peak signals, and the peak signal Pd1 of the down period is divided into three peak signals. And, the paired data of all combination with the peak signal of the down period and the peak signal of the up period is generated. Accordingly, if all peak signals of the up period and the down period have three target information, the number of peak signals of the up period is n, and the number of the peak signals of the down period is m, so that its combination becomes 3n×3m.

The paired data consisting of the peak signals of the up period and the peak signals of the down period has, for example, seven parameters as follows. Specifically, the pair data has seven parameters, (i) peak power of the up period, (ii) peak power of the down period, (iii) peak power difference, (iv) angular power of the up period, (v) angular power of the down period, (vi) angular power difference, and (vii) angular difference. The method of deriving the discrimination function using the seven parameters will now be described. Hereinafter, the seven parameters become seven variables to constitute the discrimination function, but the number of the parameters (the number of variables) is one example, and thus may be varied.

<1-5. Description of Discrimination Function>

Figure 6:
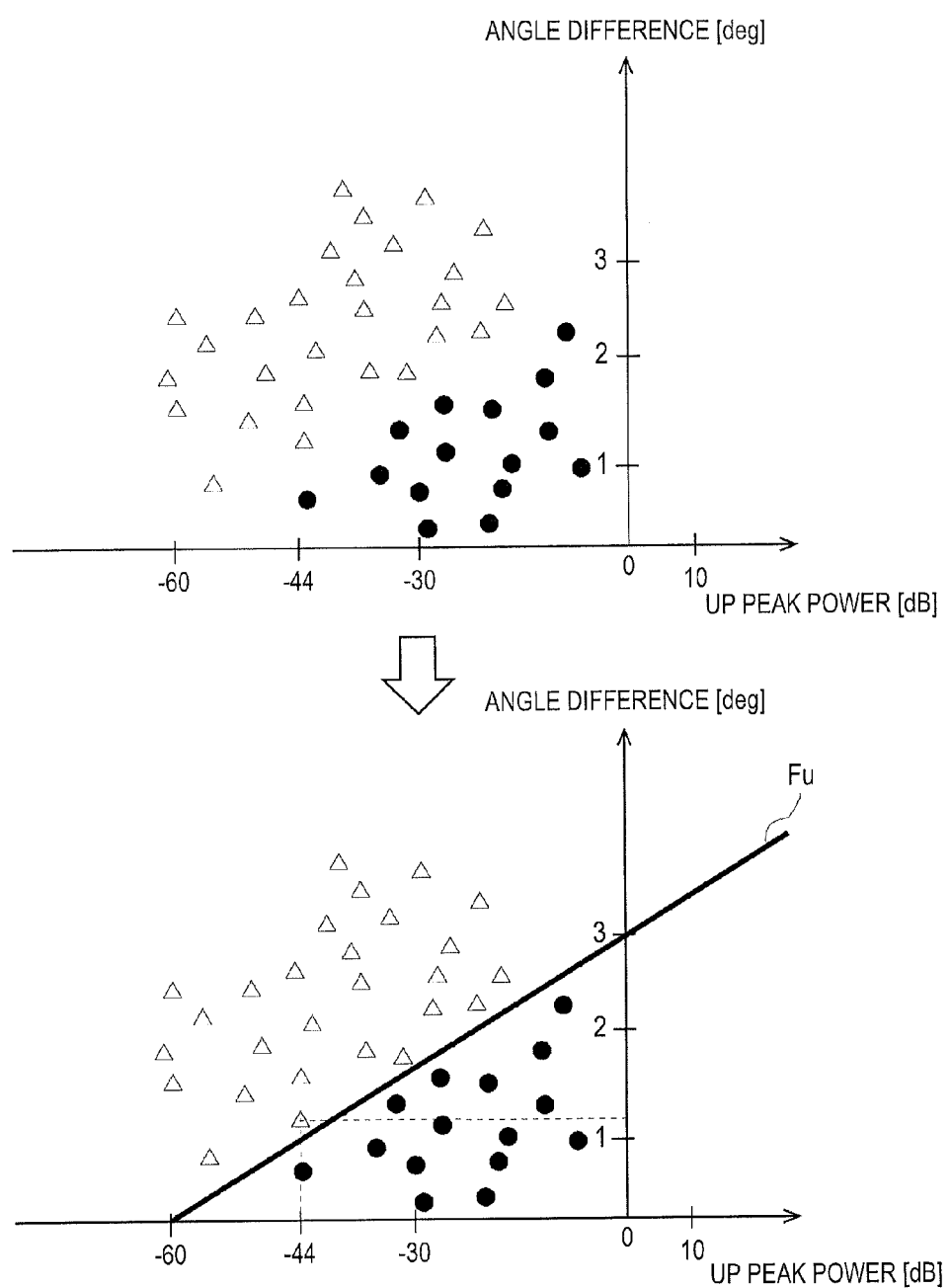
FIG. 6 is a diagram for describing a method of deriving a discrimination function.

FIG. 6 is a diagram for describing the method of deriving the discrimination function. The upper drawing and the lower drawing in FIG. 6 show graphs having two parameters of the paired data as axes, of which a horizontal axis represents the peak power of the up period, and a vertical axis represents the angular difference. In the upper drawing in FIG. 6, the normal-paired data among the paired data subjected to the pairing process is indicated by circular marks (•), while the mis-paired data is indicated by triangular marks (Δ). Each mark is plotted at a coordinate position of the parameter value carried by the respective paired data. Meanwhile, the normal-paired data and the mis-paired data are experimentally derived, in order to derive the discrimination function, before the radar apparatus 1 is manufactured.

Herein, the parameters of the normal-paired data and the mis-paired data have the following characteristics. In a case where the up peak power of the paired data is relatively large, it becomes the normal-paired data even when there is the angular difference. Specifically, even in the case where the reflection level of the reflection wave from the target is high, the up peak power corresponding to the reflection level becomes power less than about 0 dB at a maximum. When the angular difference of this case is within about 3 degrees, the paired data becomes the normal-paired data. Further, in comparison to the case where the up peak power of the paired data is relatively small, if the angular difference is relatively high, it becomes the mis-paired data. Specifically, in a case where the up peak power is relatively low, that is, −44 dB, when the angular difference of this case exceeds about 1.0 degrees, the paired data becomes the mis-paired data. The up peak power and the angular difference have a condition of dividing the normal-paired data and the mis-paired data, and other parameter of the paired data has a condition of dividing the normal-paired data and the mis-paired data. The function calculated based on the condition becomes the discrimination function.

That is, as illustrated in the lower drawing in FIG. 6, the parameters of the up peak power and the angular difference is provided with a boundary line Fu for dividing a group of the circular marks which are normal-paired data, and a group of the triangular marks which are mis-paired data, and the boundary line Fu becomes a reference to determine the true and false of the paired data by the discrimination function expressed by the expression. The boundary line is represented by Expression 4, and the discrimination function is represented by Expression 5. The discrimination function represented by Expression 5 is recorded in the memory 172 at the time of manufacturing the radar apparatus 1 as the discrimination data 172a of the memory 172. Meanwhile, the peak power uses a predetermined electric power as a reference, and has a value represented by its ratio in unit of dB.

[Expression 4]

$$a_1 \cdot x_1 + a_2 \cdot x_2 + a_0 = 0 \quad (4)$$

[Expression 5]

$$f(x_i) = a_1 \cdot x_1 + a_2 \cdot x_2 + a_0 \quad (5)$$

Herein, the discrimination function represented by Expression 5 is a function using two parameters (peak power and angular difference of the up period) among seven parameters described above as variables ($x_1$ and $x_2$), and having a constant term $a_0$, in which each of two variables ($x_1$ and $x_2$) has coefficients ($a_1$ and $a_2$). In other words, the coefficient or the constant term of the discrimination function is determined by a slope of the boundary line Fu indicative of the boundary of the true and the false, or an intersection point between the boundary line Fu and the vertical axis. In a case where the number of the parameters is increased (e.g., in a case where two parameters is increased to three or more parameters), the number of coefficients and variables of the discrimination function is accordingly increased. For example, in the case of seven parameters, it results in Expression 6 having seven coefficients and variables. The value derived from the discrimination function is normalized, and is used as the discrimination score.

[Expression 6]

$$f(x_i) = a_1 \cdot x_1 + a_2 \cdot x_2 + a_3 \cdot x_3 + a_4 \cdot x_4 + a_5 \cdot x_5 + + a_6 \cdot x_6 + a_7 \cdot x_7 + a_0 \quad (6)$$

Figure 7:
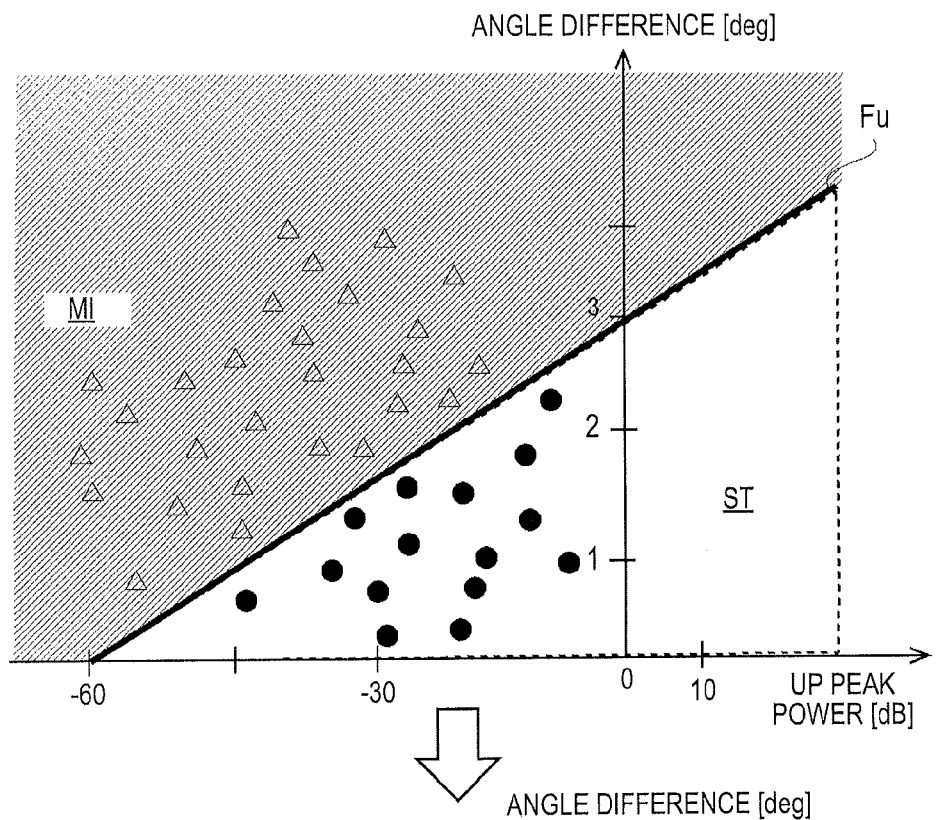
FIG. 7 is a diagram for describing selection of normal-paired data based on the discrimination function.
Figure 7:
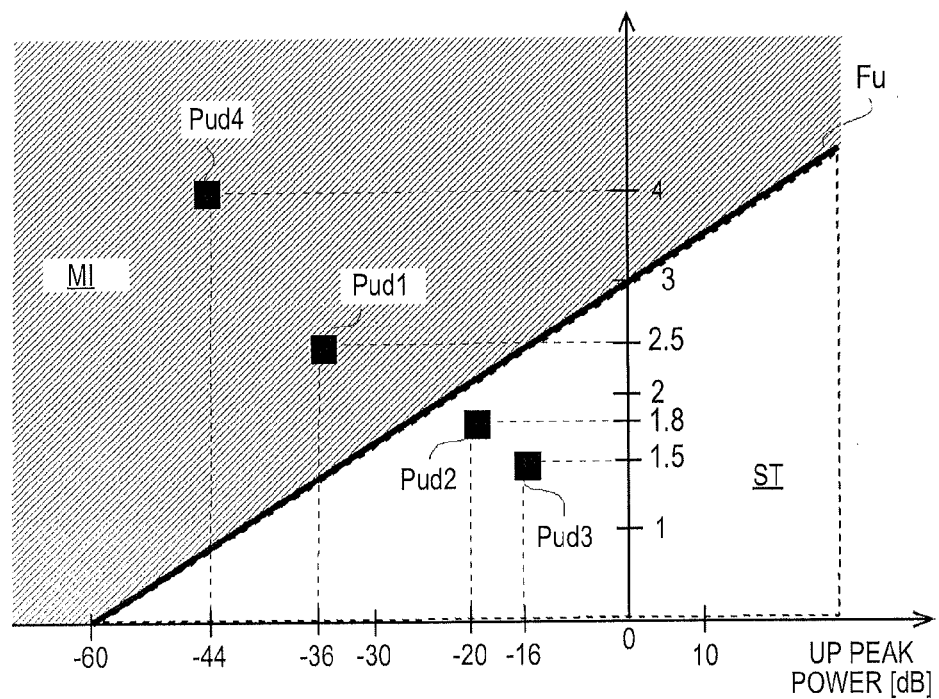

In the below description, it will be continuously described based on two parameters (two variables) for the simplicity of description. FIG. 7 is a diagram for describing the method of selecting the normal-paired data based on the discrimination function. The upper drawing and the lower drawing in FIG. 7 show graphs having two parameters of the paired data as axes, of which a horizontal axis represents the peak power of the up period, and a vertical axis represents the angular difference, in the same manner as FIG. 6.

The upper drawing of the FIG. 7 shows two regions which are divided by the boundary line Fu corresponding to the discrimination function. That is, the upper drawing in FIG. 7 shows respectively a normal region ST which is a region of the normal-paired data, and a wrong region MI which is a region of the mis-paired data. For this reason, in a case where a value of the parameter of the paired data which is paired by the signal processing unit 17 is included in the wrong region MI which is above the boundary line Fu, there is a possibility that the paired data is the mis-paired data. Meanwhile, in a case where the discrimination function is substituted by the parameter value corresponding to the coordinate position in the wrong region MI, the discrimination score becomes a negative value. For this reason, if the discrimination score is negative, there is a relatively high possibility that the paired data is the mis-paired data.

In a case where the value of the parameter of the paired data is included in the normal region ST which is below the boundary line Fu, there is a possibility that the paired data is the normal-paired data. Meanwhile, in a case where the discrimination function is substituted by the parameter value corresponding to the coordinate position in the normal region ST, the discrimination score becomes a positive value. For this reason, if the discrimination score is positive, there is a relatively high possibility that the paired data is the normal-paired data. Further, in a case where the discrimination score is ±0, the coordinate position based on the parameter of the paired data becomes the coordinate position on the boundary line Fu.

The lower drawing in FIG. 7 shows an example of determining whether the paired data belongs to any one of the normal region ST and the wrong region Mi, as a result of substituting the discrimination function by the parameter value of the paired data which is derived by the signal processing unit 17 when the vehicle runs after manufacturing the radar apparatus 1. By taking the lower drawing in FIG. 7 and Expression 7, in which the coefficients $a_1$ and $a_2$ in Expression 5 described above are set to $a_1=+0.05$ and $a_2=-1.0$, and the constant term $a_0$ is set to $a_0=+3.0$, as an example, it will be described the selection of normal-paired data based on the plurality of parameters of each paired data and the discrimination function.

[Expression 7]

$$f(x_i) = 0.05 \cdot x_1 - 1.0 \cdot x_2 + 3.0 \quad (7)$$

The lower drawing in FIG. 7 shows four paired data, that is, paired data Pud1, Pud2, Pud3 and Pud4. The plurality of paired data is data obtained by individually pairing the peak signal Pd1 of the down period, and the peak signals Pu1, Pu2, Pu3 and Pu4 of the up period, which are illustrated in FIG. 4, by the signal processing unit 17. The paired data indicates a portion of the plurality of paired data obtained by individually pairing the peak signal Pd1 of the down period and all peak signals of the up period. From the parameter values (Pud1: −36 dB of up peak power, 2.5 deg of angular difference, Pud2: −20 dB of up peak power, 1.8 deg of angular difference, Pud3: −16 dB of up peak power, 1.5 deg of angular difference, and Pud4: −44 dB of up peak power, 4.0 deg of angular difference) of each peak signal, the paired data Pud2 and Pud3 are included in the normal region ST, and the paired data Pud1 and Pud4 are included in the wrong region MI. Meanwhile, the angular difference between two parameters is shown as an absolute value.

The signal processing unit 17 substitutes a variable of Expression 6 corresponding to the discrimination function by each parameter value of each pair data to derive the discrimination score indicative of the degree of true/false in the pairing of the paired data. As a result, the paired data Pud1 to Pud4 has the discrimination scores of −1.3 (Pud1), +0.2 (Pud2), +0.7 (Pud3), and −3.2 (Pud4). As described above, according to the discrimination score, the discrimination score is ±0 in the case where the coordinate position of the paired data is on the boundary line Fu. Further, as the score is increased, the possibility of the normal-paired data is increased, while as the score is decreased, the possibility of the mis-paired data is increased.

For this reason, the possibility that the paired data Pud3 (+0.7) having the highest discrimination score among the plurality of paired data Pud1 to Pud4 is the normal-paired data is highest, and the signal processing unit 7 selects the paired data Pud3 as the normal-paired data. In this way, the signal processing unit 17 performs the process of calculating the discrimination score using the discrimination function which is the linear function for the selection of the normal-paired data, thereby improving the precision in selection of the normal-paired data and decreasing a processing load of the signal processing unit 17, in comparison to the process of calculating the Mahalanobis distance using the matrix function. As a result, it is possible to improve the precision in vehicle control of the vehicle control device 2 and also shorten the processing time. Further, it is possible to select the paired data of the correct combination in a quantitative way.

For example, the case where the normal-paired data is selected using the Mahalanobis distance through an experiment is compared with the case where the normal-paired data is derived using the discrimination function, for three parameters (e.g., peak power difference, angular difference, and angular power difference) and seven parameters (e.g., (i) peak power of the up period, (ii) peak power of the down period, (iii) peak power difference, (iv) angular power of the up period, (v) angular power of the down period, (vi) angular power difference, and (vii) angular difference). As a result, when the number of parameters is three, a probability of discriminating the normal-paired data as the miss-paired data is 41%, but when the parameters are increased by 7, a probability of discriminating the normal-paired data as the miss-paired data is 15% (−26%), thereby resulting in the remarkable improvement in true/false discrimination of pairing.

In comparison to the case where the normal-paired data is derived based on the Mahalanobis distance (matrix computation) using seven parameters, the processing time of the signal processing unit 17 is decreased by about ⅛ (12.5%) in the case where the normal-paired data is derived based on the discrimination score which is calculated by the discrimination function (linear function) using the same seven parameters. For this reason, in the case where the number of parameters is increased to improve the precision of pairing, as the normal pair is derived based on the discrimination function, the processing load of the signal processing unit 17 to derive the normal-paired data is decreased, as well as the improvement in precision of pairing. Therefore, the precision of the vehicle control of the vehicle control device 2 can be improved, and the processing time can also be shortened.

Meanwhile, for other paired data, the paired data Pud4 (−3.2 score) having the lowest discrimination score becomes paired data that would be most probably mis-paired data. In other words, as the distance is far away from the boundary line Fu in each region divided by the boundary line Fu, a possibility that is the state (any one state of the normal-paired data and the mi-paired data) of the paired data represented by the region becomes high. Specifically, although all the paired data Pud2 and Pud3 belongs to the normal region ST, the possibility that it is the normal-paired data is high for the paired data Pud3 more than the paired data Pud2. Further, although all the paired data Pud1 and the paired data Pud4 belongs to the wrong region MI, the possibility that it is the miss-paired data is high for the paired data Pud4 rather than the paired data Pud1.

Returning back to FIG. 2, the CPU 171 performs various computation processes based on various programs stored in the memory 172. For example, the process of selecting the normal-paired data based on the discrimination function is performed in the above-described pairing process.

The memory 172 is stored with an execution program, such as various computation processes executed by the CPU 171. Further, the memory 172 is stored with plural target information derived by the signal processing unit 17. For example, the memory is stored with target information (vertical distance, horizontal distance and relative speed of the target) derived in the past process and the current process. Further, the memory 172 is stored with discrimination data 172a which is data of the discrimination function used in the pairing process.

The transmission control unit 107 is connected to the signal processing unit 17, and outputs the control signal to the signal generating unit 11 for generating a modulated signal, based on the signal from the signal processing unit 17. Further, the transmission control unit 107 outputs the control signal to the conversion unit 131 connected to any one transmission antenna of the transmission antenna 13a and the transmission antenna 13b and the oscillator 12, based on the signal from the signal processing unit 17.

The vehicle control device 2 controls operations of various devices provided in the vehicle CR. That is, the vehicle control device 2 obtains information from various sensors, such as the vehicle speed sensor 40 and the steering sensor 41. The vehicle control device 2 controls the behavior of the vehicle CR by operating various devices, such as the brake 50 and the throttle 51, based on the information obtained from various sensors and the target information obtained from the signal processing unit 17 of the radar apparatus 1.

Examples of the vehicle control performed by the vehicle control device 2 may include the following. The vehicle control device 2 performs the control to protect passengers of the vehicle CR in preparation for that the vehicle CR collides with an obstacle. Specifically, in a case where danger of a collision exists, a user of the vehicle CR is given by warning indication using an alarm device (not illustrated), or PCS (Pre-crash Safety System) is controlled to reduce the speed of the vehicle CR by controlling the brake 50 of the vehicle CR. Further, the vehicle control device 2 performs the PCS control by fixing the passenger to a seat by means of a seat belt or fixing a headrest to reduce damage of a passenger's body of the vehicle CR against an impact when collision occurs.

The vehicle speed sensor 40 outputs a signal according to the speed of the vehicle CR based on a rotational speed of an axle of the vehicle CR. The vehicle control device 2 takes a current speed of the vehicle based on the signal from the vehicle speed sensor 40.

The steering sensor 41 detects a steering angle of a steering wheel which is operated by a driver of the vehicle CR, and transmits the information on an angle of a vehicular body of the vehicle CR.

The brake 50 decelerates the speed of the vehicle CR by the operation of the driver of the vehicle CR. Further, the brake 50 decelerates the speed of the vehicle CR by the control of the vehicle control device 2. For example, the speed of the vehicle CR is decelerated to maintain the distance between the vehicle CR and a preceding vehicle at a constant distance.

The throttle 51 accelerates the speed of the vehicle CR by operation of the driver of the vehicle CR. Further, the throttle 51 accelerates the speed of the vehicle CR by the control of the vehicle control device 2. For example, the throttle 51 accelerates the speed of the vehicle Cr to maintain the distance between the vehicle CR and a preceding vehicle at a constant distance.

2. Processing Flowchart

<2-1. Overall Processing>

Figure 8:
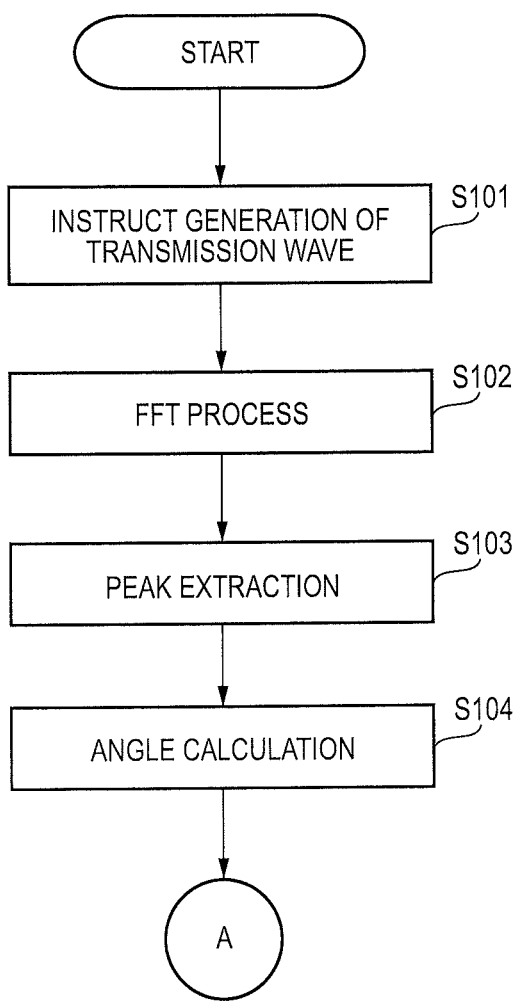
FIG. 8 is flowchart illustrating a process of deriving target information by a signal processing unit.
Figure 9:
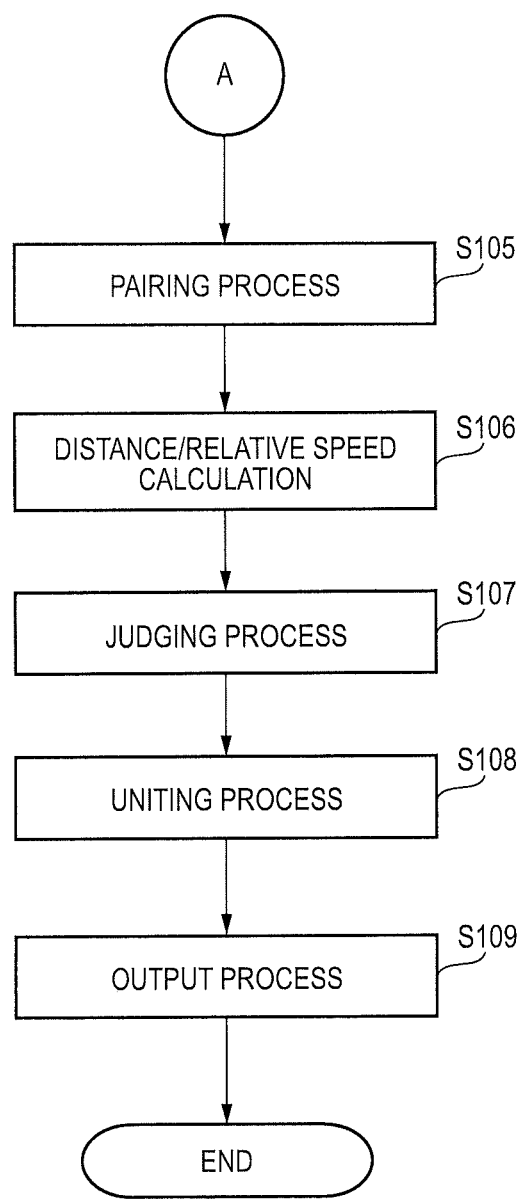
FIG. 9 is flowchart illustrating a process of deriving target information by a signal processing unit.

FIGS. 8 and 9 are flowcharts illustrating the process in which the signal processing unit 17 derives the target information. The signal processing unit 17 outputs an instruction signal of generating the transmission wave to the transmission control unit 107 (step S101). The signal generating unit 11 is controlled by the transmission control unit 107 to which the instruction signal is input from the signal processing unit 17, and the transmission wave corresponding to the transmitting signal is generated. The generated transmission wave is output outwardly from the vehicle. Meanwhile, in a case where one up period and one down period are set to one cycle in the transmitting signal of the transmission antenna 13, the transmission wave corresponding to one cycle is output from one transmission antenna 13a to the outside of the vehicle, while the transmission wave corresponding to the other cycle is output from the other transmission antenna to the outside of the vehicle.

The reception antenna 14 receives the reflection wave which comes from the target at which the transmission wave reflects, and the mixer 15 mixes the transmitting signal and the receiving signal corresponding to the reflection wave to generate the beat signal which is a difference between the transmitting signal and the receiving signal. The beat signal which is the analog signal is converted into the digital data by the AD converter 16, and then is input to the signal processing unit 17.

The signal processing unit 17 performs FFT on the beat signal which is the digital data to generate a transformed signal (step S102).

The signal processing unit 17 extracts the transformed signal, which exceeds the threshold value sh, among the transformed signals of the up period and the down period which are FFT-transformed (step S103). All peak signals of each period of the up period and the down period are extracted by the above processing, and the number of the peak signals of the up period and the down period is determined.

The signal processing unit 17 performs the angle computation based on the peak signal in each period of the up period and the down period (step S104). Specifically, the signal processing unit 17 derives the angle of the target by a given algorithm of the angle driving processing. For example, the algorithm of the angle driving processing is ESPRIT (Estimation of Signal Parameters via Rotational Invariance Techniques). A proper value and a proper vector of a correlation matrix are calculated from the information on the phase difference of the received signal in each reception antennas 14a to 14d, and an angle θup corresponding to the peak signal of the up period and an angle θdn corresponding to the peak signal of the down period are derived. Meanwhile, in the case where each peak signal of the up period and the down period is paired, the angle of the target is derived by Expression 3 described above.

The signal processing unit 17 pairs the peak signals of the up period and the down period (step S105), and selects the normal-paired data from the plurality of paired data based on the discrimination function. The signal processing unit 17 performs the computation of the vertical distance and the relative speed of the vehicle and the target based on Expressions 1 and 2 (step S106). Herein, the detailed pairing process in step S105 will be described with reference to a flowchart of FIG. 10.

<2-2. Paring Process>

Figure 10:
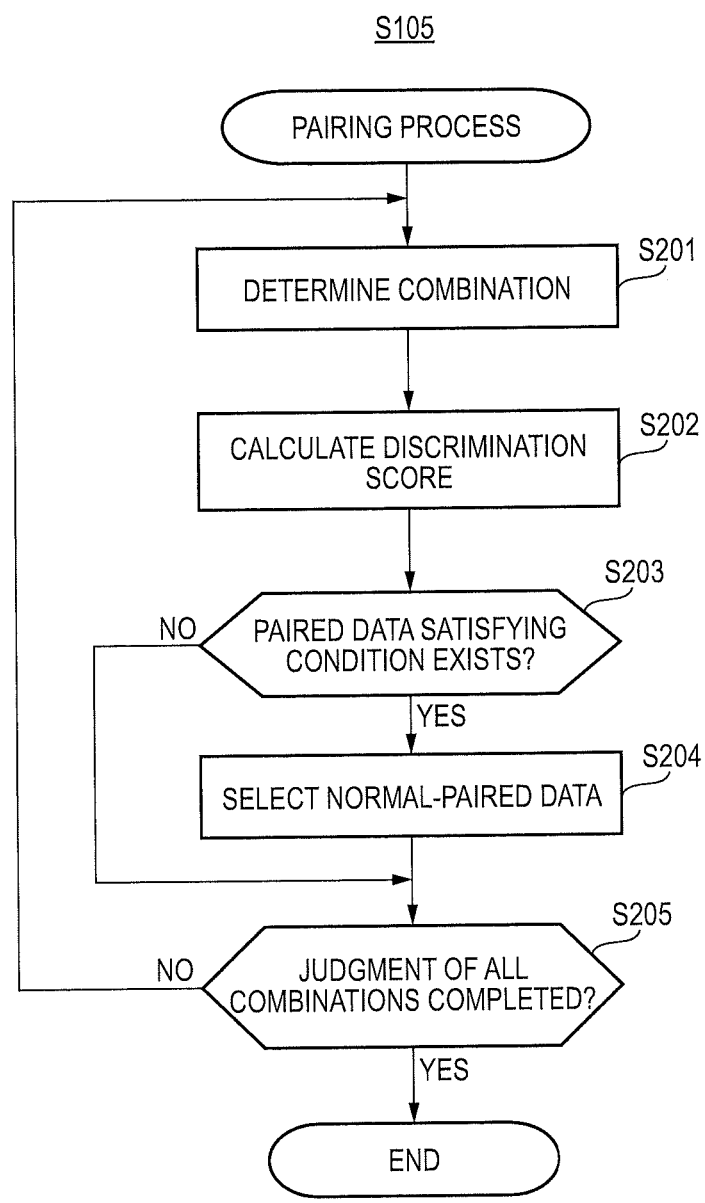
FIG. 10 is a flowchart illustrating a process of selecting the normal-paired data at a pairing process.

FIG. 10 is a flowchart illustrating the process of selecting the normal-paired data at the pairing process. At the pairing process, the signal processing unit 17 first determines a combination of the peak signals to be paired (step S201). Specifically, by using the peak signal (peak signal Pd1) of the down period illustrated in FIG. 5 as the reference peak signal, plural combinations are determined, of which all peak signals (peak signals Pu1 to Pun) of the up period illustrated in FIG. 4 are individually to be paired.

Then, the signal processing unit 17 reads the discrimination data 172a from the memory 172, and substitutes the variable corresponding to the discrimination function of the discrimination data 172a by values of the plurality of parameter (e.g., seven parameters) of the peak signals (step S202).

The signal processing unit 17 judges whether the normal-paired data exists or not, based on the discrimination score (step S203). As a result, for example, if the paired data satisfying the condition (paired data having the highest positive discrimination score) of the normal-paired data exists (Yes in step S203), the signal processing unit selects the paired data satisfying the above condition as the normal-paired data (step S204).

The signal processing unit 17 judges whether or not the process of selecting the normal-paired data is completed for all combinations of the peak signals of the up period and the peak signals of the down period (step S205). If the process is not completed (No in step S205), it returns to the process of determining the combination of the paired data in step S201, and the signal processing unit determines the combination of all peak signals of the up period by using the next peak signal (e.g., the peak signal Pd2 next to the peak signal Pd1) of the down period as the reference peak signal (step S201).

In the process of step S205, if the selection of the normal-paired data for all combinations is completed (Yes in step S205), the signal processing unit 17 completes the process. In this way, the signal processing unit 17 performs the process of calculating the discrimination score using the discrimination function (linear function) at the selection of the normal-paired data, thereby improving the precision in selection of the normal-paired data, and decreasing the processing load of the signal processing, in comparison to the process of calculating the Mahalanobis distance using the matrix computation. As a result, the precision in vehicle control of the vehicle control device 2 can be improved, and the processing time can be shortened.

Returning back to step S203, if the paired data satisfying the condition of the normal-paired data does not exist (No in step S203), the signal processing unit 17 judges whether or not the process of selecting the normal-paired data is completed for all combinations of the peak signals (step S205), similar to after the process of selecting the normal-paired data is completed in step S204 described above. If the process is not completed (No in step S205), it returns to the process of determining the combination of the paired data in step S201. In the process of step S205, the process is terminated in the case (Yes in step S205) where the process of selecting the normal-paired data for all combinations is completed.

Returning back to step S107 in FIG. 9, the signal processing unit 17 performs the process of judging whether a temporally consecutive relation exists between data (hereinafter referred to current paired data) paired by the current target deriving process, and data (hereinafter referred to as predicted paired data) predicting the current paired data based on the target information derived by the past target deriving process. If the temporally consecutive relation exists between both data, a filtering process is performed between the current paired data and the predicted paired data, and the filtered paired data (hereinafter referred to as past correspondent paired data) is derived as the target information of the current process (step S107). Herein, the case where the temporally consecutive relation between both data exists means a case where a difference value in the vertical distance, the horizontal distance and the relative speed between the current paired data and the predicted paired data is within a predetermined value. Meanwhile, if a plurality of the current paired data exists within the predetermined value, the current paired data having the lowest difference value between the predicted paired data and the current paired data has the temporally consecutive relation with the target information of the previous process.

If the temporally consecutive relation (hereinafter referred to as continuity) exists between them, that is, if the continuity exists between the current paired data and the target information of the previous process as the result of the judgment process, the signal processing unit 17 performs weighting of a value 0.5 for the vertical distance of the predicted paired data, and weighting of a value 0.5 for the vertical distance of the current paired data at the vertical distance, and derives the result by adding both values as the vertical distance of the past correspondent paired data of the current target deriving process. Meanwhile, even with respect to the relative speed and the angle, a given process of weighting the predicted paired data and the current paired data is performed.

If the difference value of the vertical distance, the horizontal distance and the relative speed between the current paired data and the predicted paired data is not within the predetermined value, the signal processing unit 17 judges that there is no continuity between the current paired data and the target information of the previous process. The paired data judged that there is no continuity becomes data (hereinafter referred to as newly paired data) which is first derived in the current target deriving process. For the newly paired data, the distance, the relative speed, the angle, and the signal level of the newly paired data become information on the distance, the relative speed, the angle, and the signal level of one target in the current target deriving process.

The signal processing unit 17 performs a process of uniting plural target information as one target information corresponding to one object (step S108). For example, in the case where the transmission wave is emitted from the transmission antenna 13 of the radar apparatus 1, the reflection wave to be received by the reception antenna 14 exists plural when the transmission wave is reflected from the preceding vehicle. That is, the reflection waves from a plurality of reflection points arrive at the reception antenna 14 for the same object. As a result, the signal processing unit 17 derives plural target information having different positions based on the respective reflection waves, but since it is originally the target information on one object (e.g., vehicle), the signal processing unit 17 performs the process of uniting each target information as one to be handled as the target information of the same object. For this reason, if each relative speed of plural target information is substantially equal, and the vertical distance and the horizontal distance of each target information are within a predetermined range, the signal processing unit 17 regards plural target information as the target information on the same object, and then performs the process of uniting plural target information as the target information corresponding to one target.

The signal processing unit 17 outputs the target information united in the process of step S108 to the vehicle control device 2 (step S109). The vehicle control device 2 is output by the target information having the continuities of at least a predetermined number of times by the judgment process during several target deriving processes. For example, an output flag of the target information having the continuity of three times is set to on to output to the vehicle control device, during several target deriving processes.

Specifically, for example, in the first process of five target deriving processes which are temporally consecutively performed, the case where the signal processing unit 17 derives the normal-paired data corresponding to any object is represented by a mark ○, while the case of not deriving the normal-paired data is represented by a mark x. After the second process, the case (having the continuity) where the signal processing unit 17 derives the normal-paired data corresponding to the same object as any object is represented by a mark ○, while the case (having no continuity) of not deriving the normal-paired data is represented by a mark x.

Seeing the target deriving processes of deriving the normal-paired data in time series five times, even though it contains a case (e.g., a case where the normal-paired data corresponding to the same object is not derived in the third process) of no continuity during several target deriving processes, like the first process ○→the second process ○→the third process x→the fourth process x→the fifth process ○, the signal processing unit 17 performs the output process to the vehicle control device 2, as follows.

That is, with respect to the normal-paired data which is judged that there is the continuity in the past target deriving process (e.g., the first and second target deriving processes in the case where the third process is regarded as the recent target deriving process), the signal processing unit 17 performs a process (hereinafter referred to as an extrapolation process) of assuming that the normal-paired data is derived in the third target deriving process, even though the normal-paired data corresponding to the same object as the normal-paired data is not derived.

Even in the case where the normal-paired data is not derived in practice in the third target deriving process by the extrapolation process, the signal processing unit 17 generates pseudo normal-paired data under given conditions. As a result, the result of the judgment process is deferred in the third target deriving process. That is, by the result of the process of judging the next target deriving process while the state in which the target information of the second target deriving process has the two continuities, it is determined whether the target information on the normal-paired data is output to the vehicle control device 2.

Similar to the third process, the result of the judgment process is deferred in the next fourth process (fourth process x), and the normal-paired data generated by the fourth extrapolation and the normal-paired data derived in the fifth target deriving process have the continuity in the fifth target driving process (fifth process ○). For this reason, the normal-paired data of the same object has three continuities as the result of the first, second and fifth target deriving processes, and the target information on the normal-paired data is output to the vehicle control device 2.

The signal processing unit 17 outputs the target information on the normal-paired data having the continuities of at least a predetermined number of times to the vehicle control device 2. However, since at least any one of the vehicle CR and the target is moved during several target deriving processes, there is a case where a receiving level of the reflection wave from the target is temporarily lowered according to the positions of the target from which the transmission wave is reflected, and thus the normal-paired data derived in the previous target deriving process is not derived temporarily. In view of this case, as the output condition to the vehicle control device 2, for example, the radar apparatus 1 sets the output flag of the normal-paired data satisfying the condition (hereinafter referred to as a first condition) in that there are three continuities including up to two extrapolation processes, as an on state, and outputs it to the vehicle control device 2. If the extrapolation process is performed in the case (fifth process x) where there is no continuity in the fifth target deriving process, the extrapolation process is regarded to be performed three times, and the first condition which is the output condition for the vehicle control device 2 is not satisfied. For this reason, the output flag is in the off state even in the case (sixth process ◦) where there is the continuity in the sixth target deriving process, and the target information on the normal-paired data is not output to the vehicle control device 2.

Second Embodiment

Next, the second embodiment will be described. In the vehicle control system 10 according to the second embodiment, when the signal processing unit 17 of the radar apparatus 1 selects the normal-paired data for the plurality of paired data generated by the recent target deriving process, based on the discrimination function, the signal processing unit 17 performs a process of selecting the normal-paired data using also the target information derived by the temporally past target deriving process. That is, in the case where there is a target (hereinafter referred to as a past consecutive target) having a temporally consecutive relation with the paired data of the recent process among the targets derived by the past process temporally consecutive with the recent process, there is a high possibility in that the paired data (hereinafter referred to as post-discrimination paired data) having the information (hereinafter referred to as past consecutive target) on the discrimination result using the discrimination function is the normal paired data. In the case where there is no the past consecutive target, there is a possibility in that the post-discrimination paired data is the mis-paired data. For this reason, in the case of the post-discrimination paired data in which the past consecutive target exists, the discrimination score is positively corrected (added). In the case of the post-discrimination paired data in which no past consecutive target exists, the discrimination score is negatively corrected (subtracted). Even in the case where the selection of the normal-paired data is difficult only using the discrimination function, it is possible to perform the more correct pairing based on the target information of the past process.

The signal processing unit 17 performs the process of selecting the normal paired-data among the plurality of pair data using the information on the presence or absence of the past consecutive data in the targets derived by the past process. The configuration and the process of the vehicle control system 10 according to the second embodiment is substantially identical to those of the first embodiment, except that the normal-paired data is selected using the information on the past consecutive target, as well as the discrimination function. The description will be given on the basis of the difference with reference to FIGS. 11 and 12.

3. Configuration

FIG. 11 is a diagram illustrating the discrimination score calculated based on the discrimination function, and the discrimination score corrected by the presence or absence of the past consecutive target of the paired data after the discrimination. Specifically, columns of the scores in FIG. 11 before correction show the discrimination scores (paired data Pud1: −1.3, Pud2: +0.2, Pud3: +0.7, and Pud4: −3.2) of the paired data Pud1, Pud2, Pud3 and Pud4 according to the first embodiment which have been described with reference to the lower drawing in FIG. 7.

Columns of the scores in FIG. 11 after correction show values added by or subtracted from the discrimination score in accordance with the presence or absence of the past consecutive target having the temporally consecutive with the post-discrimination paired data among the target information derived by the past target deriving process, with respect to the paired data Pud1 to Pud4 derived by the signal processing unit 17 in the recent target deriving process. In the addition/subtraction of the score, for example, the signal processing unit 17 adds 3.0 to the discrimination score when the past consecutive target exists, while the signal processing unit 17 subtracts 3.0 from the discrimination score when the past consecutive target does not exist.

For example, it is supposed that the past consecutive target exists in the paired data Pud1 and Pud3 which is the post-discrimination paired data, while the past consecutive target does not exist in the paired data Pud2 and Pud4 which is the post-discrimination paired data. As a result, the signal processing unit 17 changes the paired data Pud1 from −1.3 to +1.7, and the paired data Pud2 from +0.2 to −2.8. Further, the signal processing unit 17 changes the paired data Pud3 from +0.7 to +3.7, and the paired data Pud4 from −3.2 to −6.2. As a result, the signal processing unit 17 selects the paired data Pud3 having the highest discrimination score as the normal-paired data.

Figure 12:
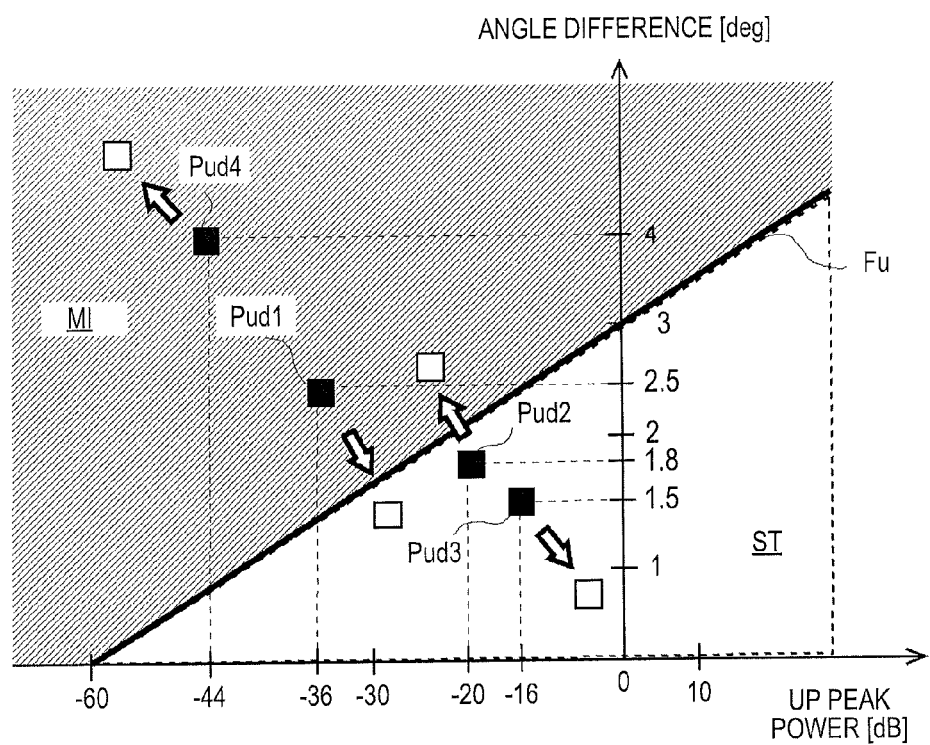
FIG. 12 is a diagram illustrating an example of variations in a coordinate position of the paired data according to the presence or absence of the past consecutive target.

FIG. 12 is a diagram illustrating an example of variations in the coordinate position of the paired data according to the presence or absence of the past consecutive target. FIG. 12 shows the example of the variations in the coordinate position of the respective paired data in accordance with the presence or absence of the past consecutive target with respect to the respective paired data of the paired data Pud1 to Pud4 shown in the lower drawing in FIG. 7 according to the first embodiment. Specifically, for the paired data Pud1 in which the past consecutive target exists, the coordinate position is changed from the wrong region MI into the normal region ST beyond the boundary line Fu. As a result, the state of the paired data regarding the true/false of the pairing is changed from the paired data having the possibility in that it can be paired in a wrong combination, to the paired data having the possibility in that it can be paired in a correct combination. Further, similar to the paired data Pud1, the paired data Pud3 in which the past consecutive target exists is within the normal region ST, and the distance from the boundary line Fu is further far away, so that there is a high possibility in that it is the data paired in a normal combination.

However, for the paired data Pud2 in which the past consecutive target does not exist, that is, the data is newly paired data first detected in the recent process, the coordinate position is changed from the normal region ST into the wrong region MI beyond the boundary line Fu. As a result, the state of the paired data regarding the true/false of the pairing is changed from the paired data having the possibility in that it can be paired in a correct combination, to the paired data having the possibility in that it can be paired in a wrong combination. Further, similar to the paired data Pud2, the paired data Pud4 in which the past consecutive target does not exist is within the wrong region MI, and the distance from the boundary line Fu is further far away, so that there is a high possibility in that it is the data paired in a wrong combination.

The signal processing unit 17 selects the normal-paired data from the plurality of paired data in accordance with the presence or absence of the past consecutive target which is the target having the temporally consecutive relation with the post-discrimination paired data among the targets derived by the past process. In this way, even in the case where the selection of the normal-paired data is difficult only using the discrimination function, it is possible to perform more correct pairing based on the target information of the past process. Meanwhile, the process is performed in the process (step S202) of calculating the discrimination score of the pairing according to the first embodiment which has been described with reference to FIG. 10.

The process of correcting the discrimination score according to the presence or absence of the past consecutive target may be performed in a case where the discrimination score of the paired data is within a predetermined score range (e.g., from −1.0 to +1.0). In other words, the process of correcting the discrimination score according to the presence or absence of the past consecutive target may be performed only for the paired data of the coordinate position near the boundary line Fu. In this way, in comparison to the case of performing the process of selecting the normal-paired data using the information on the presence or absence of the past consecutive target with respect to the all paired data, it is possible to decrease the processing load in the pairing process of the signal processing unit 17.

In the case where the newly paired data in which the past consecutive target does not exist, since there is a possibility of either the mis-paired data or the normal-paired data, it is preferable not to perform the negative correction (subtraction) on the discrimination score.

<4. Process in Case where Discrimination Score is within Predetermined Score Range>

Figure 13:
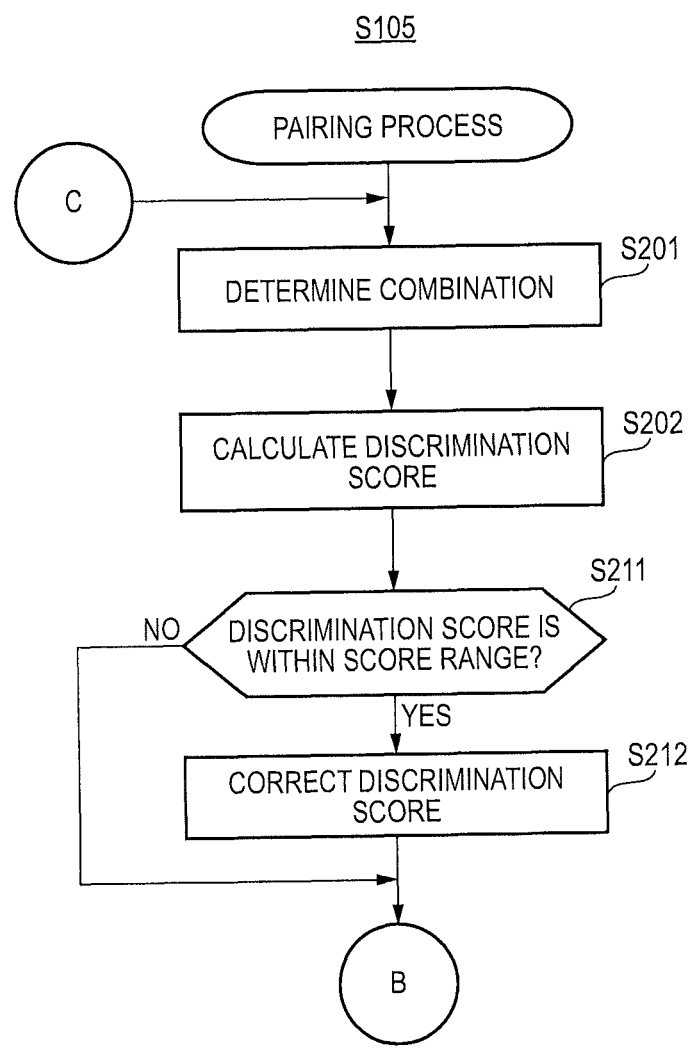
FIG. 13 is a flowchart illustrating a process of selecting the normal-paired data in a case where the discrimination score is within a desired score range.
Figure 14:
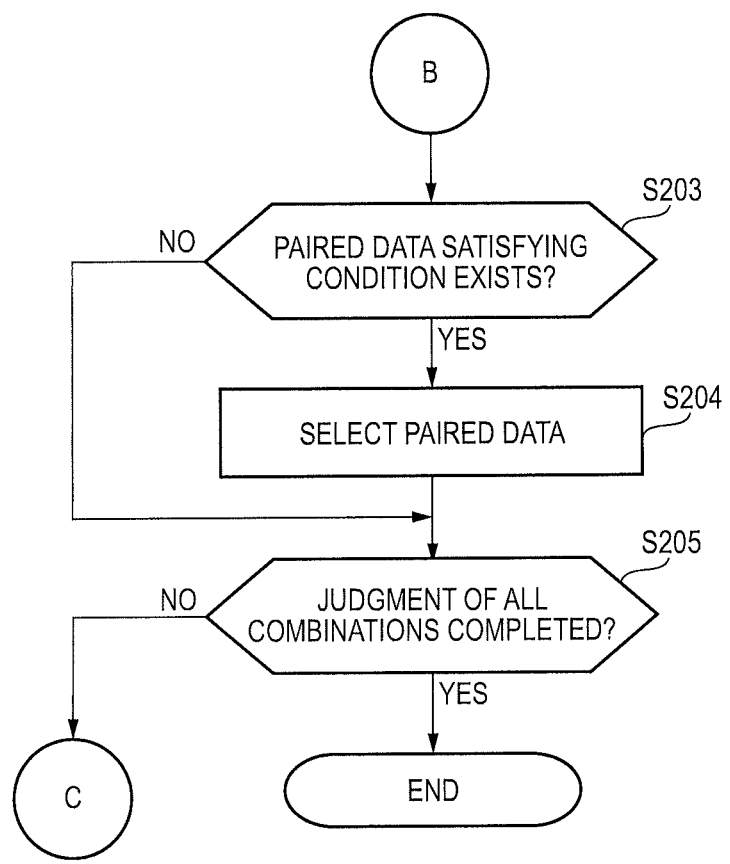
FIG. 14 is a flowchart illustrating a process of selecting the normal-paired data in a case where the discrimination score is within a desired score range.

With reference to FIGS. 13 and 14, it will be described that the signal processing unit 17 performs a process of selecting the normal-paired data from the plurality of paired data in accordance with the presence or absence of the past consecutive target, in the case where the discrimination score of the paired data is within the predetermined range.

FIGS. 13 and 14 are flowcharts illustrating the process of selecting the normal-paired data in the case where the discrimination score is within the predetermined score range. The flowcharts in FIGS. 13 and 14 have steps S211 and 212 which are added to the flowchart of the pairing process according to the first embodiment described with reference to FIG. 10.

In step S202, the signal processing unit 17 calculates the discrimination score based on the discrimination function. The signal processing unit 17 judges whether paired data having a discrimination score within a predetermined range (from −1.0 to +1.0) exists or not in the plurality of paired data (step S211). The term "predetermined range" means a score range having a possibility in that the paired data is positioned near the boundary line Fu, and can become any one of the normal-paired data and the mis-paired data, in other words, a score range having a possibility in that a question arises as to the judgment about whether it is the normal-paired data or the mis-paired data. That is, since the paired data located at the coordinate position near the boundary line Fu may become any one of the normal-paired data and the mis-paired data, the state of the paired data is regarded to be not decided, and the signal processing unit 17 judges whether it is any one of the normal-paired data and the mi-paired data, using the data (target information of the past target deriving process), in addition to the post-discrimination paired data.

If the discrimination score is within the predetermined score range (Yes in step S211), the signal processing unit 17 performs the process of correcting the discrimination score (step S212). Specifically, if the past consecutive target exists in the paired data, the signal processing unit 17 adds 3.0 to the discrimination score, and if the past consecutive target does not exist in the paired data, the signal processing unit 17 subtracts 3.0 from the discrimination score. In this way, the paired data having the possibility of the correct combination or the wrong combination can be selected based on the quantitative information. On the basis of the discrimination score, the signal processing unit 17 performs a process of judging whether the paired data having the highest positive discrimination score exists or not (step S203), similar to the first embodiment.

Third Embodiment

Now, the third embodiment will be described. In the case where the discrimination score is derived from the plurality of paired data based on the discrimination function, the signal processing unit 17 of the radar apparatus 1 performs the process of the normal-paired data in view of an image (hereinafter referred to as an object image) of the object among images captured by a camera (camera 42 illustrated in FIG. 15 which will be described later).

That is, the signal processing unit 17 selects the normal-paired data among the plurality of post-discrimination paired data using the information on the presence or absence of the object image corresponding to the post-discrimination paired data among the images captured by the camera 42. In this way, even in the case where the selection of the normal-paired data is difficult only using the discrimination function, it is possible to perform in the more correct pairing based on the target information of the device different from the radar apparatus 1. The configuration and processing of the vehicle control system according to the third embodiment is substantially identical to that of the first embodiment, except that the normal-paired data is selected using the object image among the images pictured by the camera 42, as well as the discrimination function described above. The description will be given on the basis of the difference with reference to FIGS. 15 and 18.

5. Configuration

Figure 15:
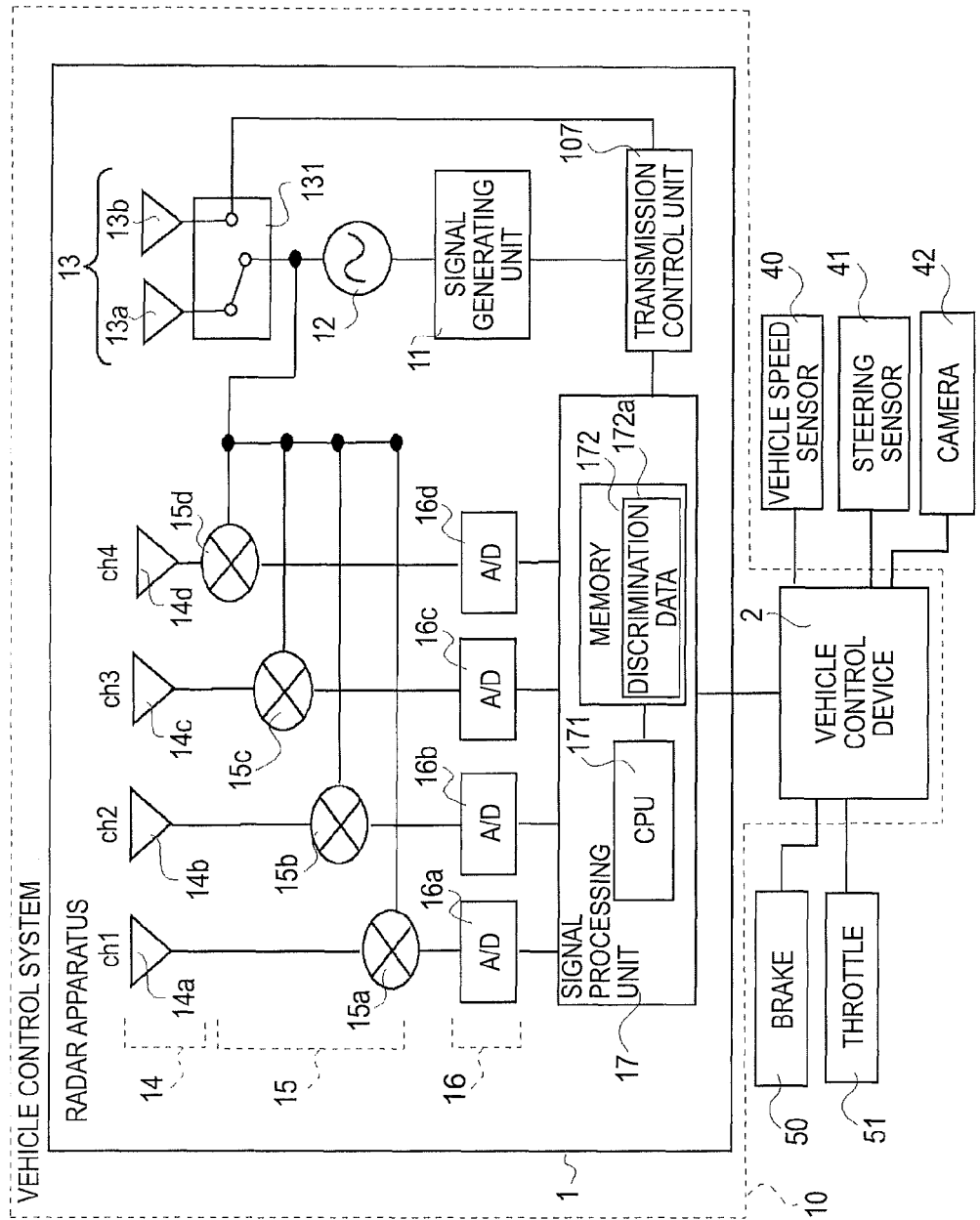
FIG. 15 is a block diagram of a vehicle control system according to a third embodiment.

FIG. 15 is a block diagram of the vehicle control system 10 according to the third embodiment. The vehicle control system 10 is provided with the camera 42 at its outside. The camera 42 is installed at a front end (e.g., near a front bumper) of the vehicle CR, and its optical axis faces a traveling direction of the vehicle CR. The camera 42 employs a wide-angle lens, such as a fish-eye lens, and has a given angle of view. The images pictured by the camera 42 are taken by the vehicle control device 2, and the object image among the images pictured by the vehicle control device 2 is recognized to derive the information such as a position or a relative speed of the real object corresponding to the object image. The vehicle control device 2 has been described with one camera of single lens as an example of the camera 42, but it is preferable to take images from cameras having a plurality of lens.

Figure 16:
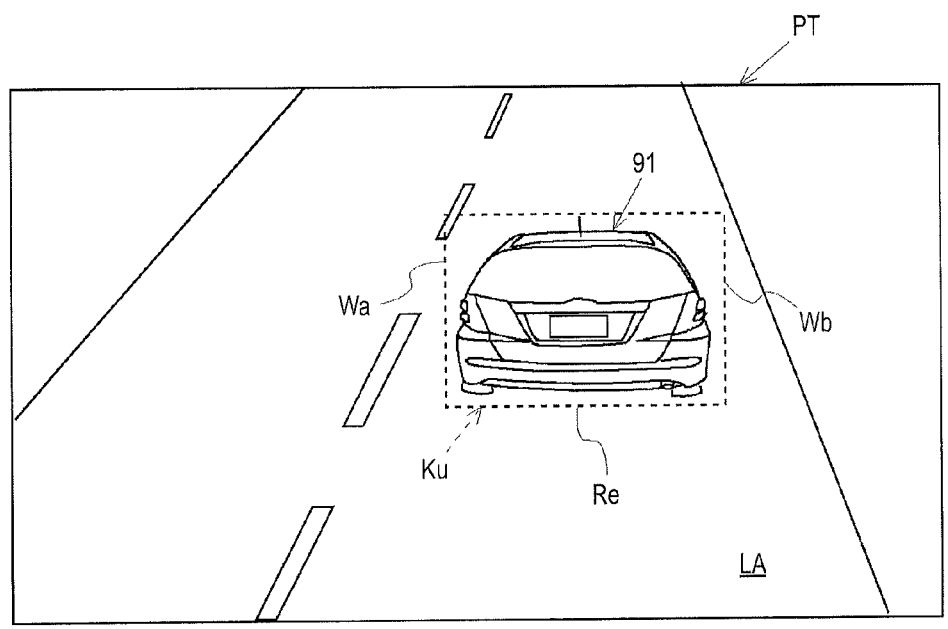
FIG. 16 is a diagram illustrating an example of an image captured by a camera.

FIG. 16 is a diagram illustrating an example of an image PT captured by the camera 42. A vehicle image 91 which is the object image corresponding to the preceding vehicle traveling along a traffic lane LA is disposed on the pictured image PT. The vehicle control device 2 recognizes the vehicle image 91 of the pictured image PT using a method known in the art to derive a distance of the vehicle image 91 in a traveling direction from the position of the vehicle image 91. For example, the vehicle control device 2 derives the distance of the preceding vehicle corresponding to the vehicle image 91, in accordance with whether a lower edge Re of the recognition area Kn positioned near a rear bumper of the vehicle image 91, in the pictured image to which a predetermined distance is assigned for each pixel.

Further, the vehicle control device 2 derives a distance of the vehicle image 91 in a horizontal direction from the position on the vehicle image 91. For example, the vehicle control device 2 derives the forward distance of the preceding vehicle corresponding to the vehicle image 91, in accordance with whether a left edge Wa and a right edge Wb of the recognition area Kn positioned near left and right rear tires which are parts of the vehicle image 91, in the pictured image to which a predetermined distance is assigned for each pixel.

Meanwhile, as the positions of the left and right edges on the image are derived, the horizontal distance of the preceding vehicle corresponding to the vehicle image 91 has a specific range corresponding to the distance between the left and right edges. For this reason, when it is judged where or not there is the object image corresponding to the paired data which is derived by the signal processing unit 17 of the radar apparatus 1 described later, if the horizontal data of the paired data is within the distance range of the horizontal direction having the specific range, it satisfies one condition of judging whether the object image corresponding to the post-discrimination paired data exists or not.

Also, the vehicle control device 2 derives the relative speed of the preceding vehicle from the variations of the coordinate position of the vehicle image 91 among the plurality of pictured images which are temporally consecutive.

The distance of the vehicle CR to be pictured with respect to the preceding vehicle in the traveling direction of the vehicle corresponds to the vertical distance of the target which is derived by the pairing process of the signal processing unit 17 of the radar apparatus 1, and the horizontal distance range of the vehicle CR to be pictured with respect to the preceding vehicle in the traveling direction of the vehicle corresponds to the horizontal distance of the target which is derived by the pairing process of the signal processing unit 17. Further, the relative speed of the preceding vehicle corresponds to the relative speed which is derived by the pairing process of the signal processing unit 17. As described above in the second embodiment, in the case where the object image indicating the substantially same values as the vertical distance, the horizontal distance, and the relative speed of the post-discrimination paired data exists in the pictured image, since there is a high possibility in that the post-discrimination paired data is the normal-paired data, the signal processing unit 17 adds the discrimination score. Further, in the case where the object image indicating the substantially same values as the vertical distance, the horizontal distance, and the relative speed of the post-discrimination paired data does not exist in the pictured image, since there is a high possibility in that the post-discrimination paired data is the mis-paired data, the signal processing unit 17 subtracts the discrimination score.

That is, the signal processing unit 17 selects the normal-paired data from the plurality of paired data using the information on the presence or absence of the object image corresponding to the past consecutive target among the images pictured by the camera 42. In this way, even in the case where the selection of the normal-paired data is difficult only using the discrimination function, it is possible to perform correct pairing according to the presence or absence of the object derived by the device difference from the radar apparatus 1. Further, the paired data having the possibility of the correct combination or the wrong combination can be selected based on the quantitative information. Meanwhile, the process is performed in the process (step S202) of calculating the discrimination score of the pairing according to the first embodiment which has been described with reference to FIG. 10.

6. Process in Case where Discrimination Score is within Predetermined Range

The process of correcting the discrimination score according to the presence or absence of the target may be performed in a case where the discrimination score of the paired data is within a predetermined score range (e.g., from −1.0 to +1.0) which has been described in the second embodiment. In other words, the process of correcting the discrimination score according to the presence or absence of the object image may be performed only for the paired data of the coordinate position near the boundary line Fu. In this way, in comparison to the case of performing the process of selecting the normal-paired data in accordance with the presence or absence of the object image with respect to the paired data having the information on the discrimination result using the discrimination function, it is possible to decrease the processing load in the pairing process of the signal processing unit 17.

7. Pairing Process Using Information on Object Image

Next, with reference to FIGS. 17 and 18, it will be described the process of selecting the normal-paired data among the plurality of post-discrimination paired data according to the presence or absence of the object image, in the case where the discrimination score of the post-discrimination paired data is within the predetermined range. Meanwhile, the process is substantially identical to the process according to the second embodiment described with reference to FIGS. 13 and 14, and thus description will be given on the basis of the difference thereof.

Figure 17:
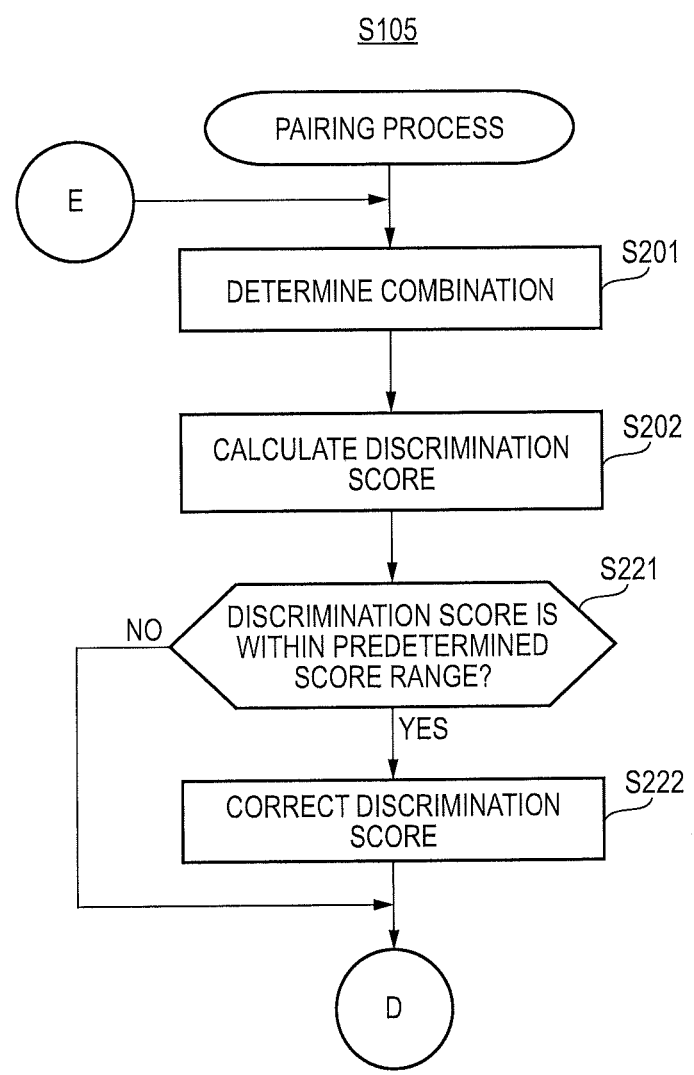
FIG. 17 is a flowchart illustrating a process of selecting normal-paired data in a case where a discrimination score is within a desired score range.
Figure 18:
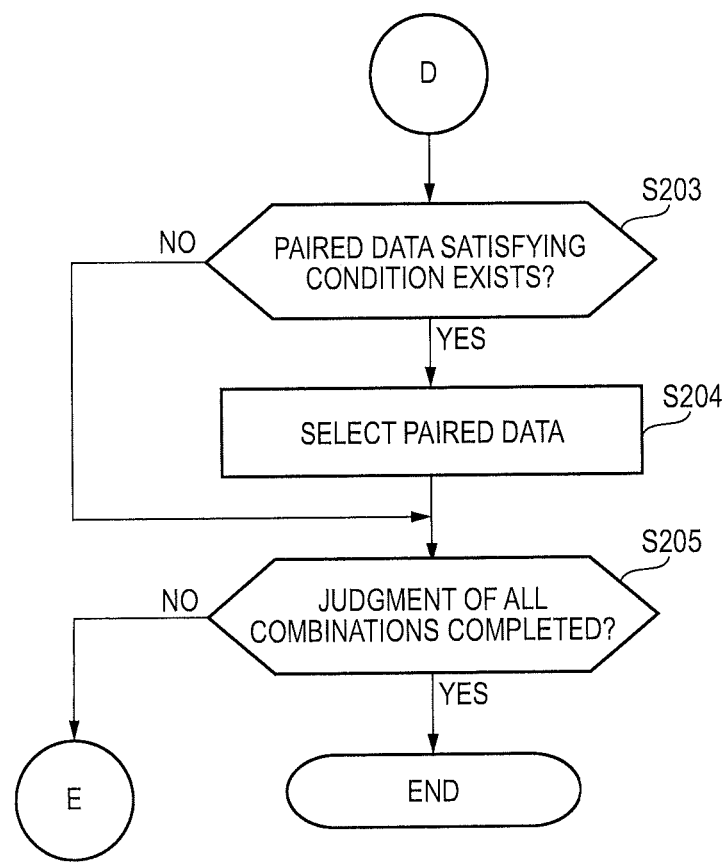
FIG. 18 is a flowchart illustrating a process of selecting normal-paired data in a case where a discrimination score is within a desired score range.

FIGS. 17 and 18 are flowcharts illustrating the process of selecting the normal-paired data in the case where the discrimination score is within the predetermined score range. The signal processing unit 17 judges whether the paired data having a discrimination score within a predetermined range (from −1.0 to +1.0) exists or not in the plurality of paired data (step S221).

If the discrimination score is within the predetermined score range (Yes in step S221), the signal processing unit 17 performs the process of correcting the discrimination score (step S222). Specifically, the signal processing unit 17 acquires the data of the object image existing in the pictured image PT from the vehicle control device 2, and judges whether the object image for the paired data having the information on the discrimination result using the discrimination function exists in the pictured image PT.

If the object image corresponding to the post-discrimination paired data exists in the pictured image PT, the signal processing unit 17 adds 3.0 to the discrimination score. Further, if the object image corresponding to the post-discrimination paired data does not exist in the pictured image PT, the signal processing unit 17 subtracts 3.0 from the discrimination score. In this way, the paired data having the possibility of the correct combination or the wrong combination can be selected based on the quantitative information, and the correct pairing can be performed. On the basis of the discrimination score, the signal processing unit 17 performs a process of judging whether the normal-paired data which is paired in the correct combination exists or not (step S203), similar to the first embodiment.

Fourth Embodiment

Next, the fourth embodiment will be described. In the first embodiment, the paired data having the highest discrimination score among the plurality of paired data has been described as the paired data having the highest possibility in that the peak signal of the up period and the peak signal of the down period are paired in the correct combination. However, even though it is the paired data having the highest discrimination score among the plurality of paired data, the combination of the peak signals in both periods may be wrong.

Specifically, if the peak level of the up period and the peak level of the down period which are parameter values of the discrimination function are relatively high, the paired data having the discrimination score to be calculated based on the discrimination function may have a relatively high discrimination score even though it contains an effect on the discrimination score of other parameters (e.g., the peak power difference, the angular power of the up period, the angular power of the down period, the angular power difference, and the angular difference). For this reason, in the case where the peak levels of both periods are relatively high, the discrimination score is relatively high even though the peak signals of both periods are paired in the wrong combination, and thus the paired data is possibly selected as the data (normal-paired data) paired in the correct combination.

Further, even when the discrimination value is negative since the paired data having the highest discrimination score among the plurality of paired data is contained in the wrong region MI, there is a possibility in that the peak signals of both periods are paired in the correct combination.

Specifically, if the peak level of the up period and the peak level of the down period which are parameter values of the discrimination function are relatively low, the paired data having the discrimination score to be calculated based on the discrimination function may have a relatively low discrimination score even though it contains an effect on the discrimination score of other parameters. For this reason, in the case where the peak levels of both periods are relatively low, the discrimination score is relatively low even though the peak signals of both periods are paired in the correct combination, and thus the paired data is possibly selected as the data (mis-paired data) paired in the wrong combination.

For this reason, in the fourth embodiment, based on the peak power of the peak signal of the up period and the peak power of the peak signal of the down period in the normal-paired data, the signal processing unit 17 sets a low-reliability region having a predetermined range near the boundary line Fu which is a boundary for discriminating the true/false of the combination of the paired data. If the normal-paired data is contained in the low-reliability region, the signal processing unit 17 changes the output condition to output the target information on the normal-paired data to the vehicle control device 2 from the radar apparatus 1. Hereinafter, description will be given in detail on the basis of the difference between the fourth embodiment and the first embodiment.

8. Configuration

Figure 19:
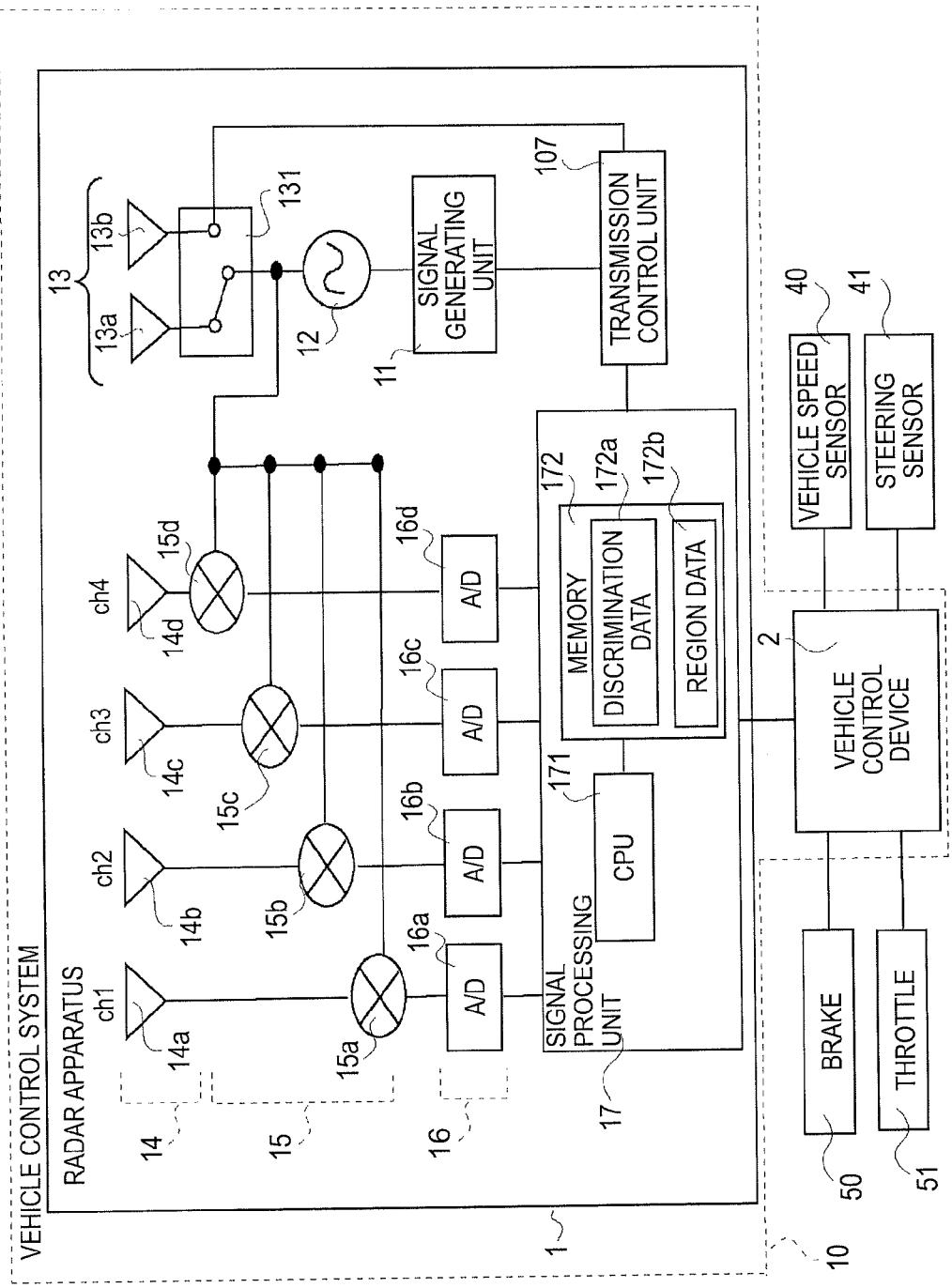
FIG. 19 is a block diagram of a vehicle control system according to a fourth embodiment.

FIG. 19 is a block diagram of the vehicle control system 1 according to the fourth embodiment. The memory 172 in FIG. 19 is recorded with region data 172b which is data used when the signal processing unit 17 sets the low-reliability region, as well as the discrimination data 172a which is data of the discrimination function represented by Expression 5 according to the first embodiment.

Figures 20, 21:
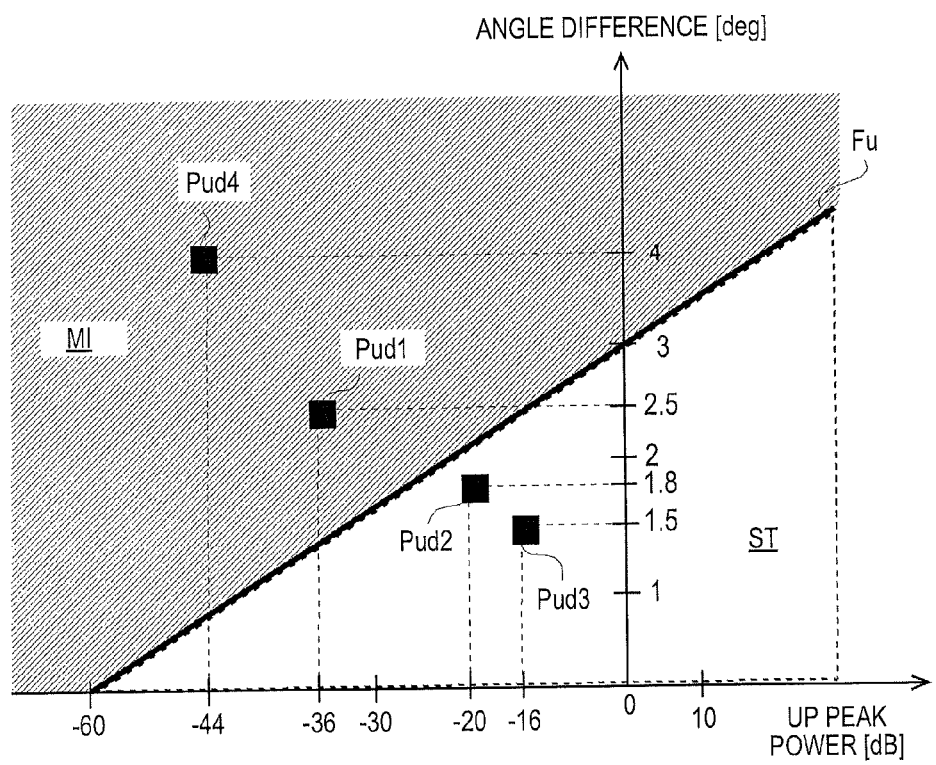
FIG. 20 is a diagram illustrating one example of region data.
FIG. 21 is a diagram for describing selection of the normal-paired data based on a discrimination function.

The setting of the low-reliability region using the region data 172b will now be described with reference to FIGS. 20 to 23. FIG. 20 is a diagram illustrating one example of the region data 172b. The region data 172b has data regarding the average peak power and the range of the low-reliability region. The average peak power is an average value of the peak power of the up period and the peak power of the down period, and the signal processing unit 17 derives it using Equation 8.

⟨Expression 8⟩

$$AveragePeakPower = \frac{UpPeriodPeakPower + DownPeriodPeakPower}{2} \quad (8)$$

FIG. 20 shows the range of the low-reliability region corresponding to the average peak power. The range of the low-reliability region indicates an area of the low-reliability region provided near the boundary of the discrimination function. Specifically, in a case where the average peak power is less than −55 dB and −45 dB or more, the range of the low-reliability region becomes a range having a width of −3.5 or more and less than 0 when the boundary line Fu is set to ±0. That is, the range having a width as much as an absolute value 3.5 of the discrimination score is set.

Further, if the average peak power is less than −45 dB and −35 dB or more, the range of the low-reliability region becomes a range having a width of −2 or more and less than +1 when the boundary line Fu is set to ±0. That is, the range (e.g., range of the low-reliability region LTa illustrated in FIG. 23 which will be described later) having a width as much as an absolute value 3 of the discrimination score is set.

If the average peak power is less than −35 dB and −25 dB or more, the range of the low-reliability region becomes a range having a width of +1 or more and less than +2.5 when the boundary line Fu is set to ±0. That is, the range (e.g., range of the low-reliability region LT illustrated in FIG. 22 which will be described later) having a width as much as an absolute value 1.5 of the discrimination score is set. If the range of the low-reliability region is set to a rectangular range, a long side corresponding to the length of the region becomes a length corresponding to the peak level of the up period and a value of the angular difference. A short side corresponding to the width of the region is shortened as the average peak power is large. The range of the low-reliability region becomes narrow as the average peak power is large.

Specifically, since the reliability in the combination of the peak signals of both periods is increased as the average peak power is large, its range becomes narrow. In this way, the target information on the normal-paired data can be early output to the vehicle control device 2. In other words, since the reliability in the combination of the peak signals of both periods is lowered as the average peak power is small, its range becomes narrow. In this way, it is possible to correctly perform the process of judging whether the data is paired in a correct combination, by delaying the output of the target information to the vehicle control device 2.

Next, the setting of the range of the low-reliability region will be described in detail. FIG. 21 is a diagram for describing the selection of the normal-paired data based on the discrimination function, and is identical to the lower drawing in FIG. 7 which has been described in the first embodiment. The paired data Pud1 to Pud4 in FIG. 21 has the discrimination scores of −1.3 (Pud1), +0.2 (Pud2), +0.7 (Pud3), and −3.2 (Pud4), as described in the first embodiment. As described above, according to the discrimination score, the discrimination score is ±0 in the case where the coordinate position of the paired data is on the boundary line Fu. Further, as the score is increased (as the position is far away from the boundary line Fu in the normal region ST), the possibility of the normal-paired data is increased, but as the score is decreased (the position is far away from the boundary line Fu in the wrong region MI), the possibility of the mis-paired data is increased.

For this reason, the possibility that the paired data Pud3 (+0.7) having the highest discrimination score among the plurality of paired data Pud1 to Pud4 is the normal-paired data is highest, and the signal processing unit 7 selects the paired data Pud3 as the normal-paired data.

Figure 22:
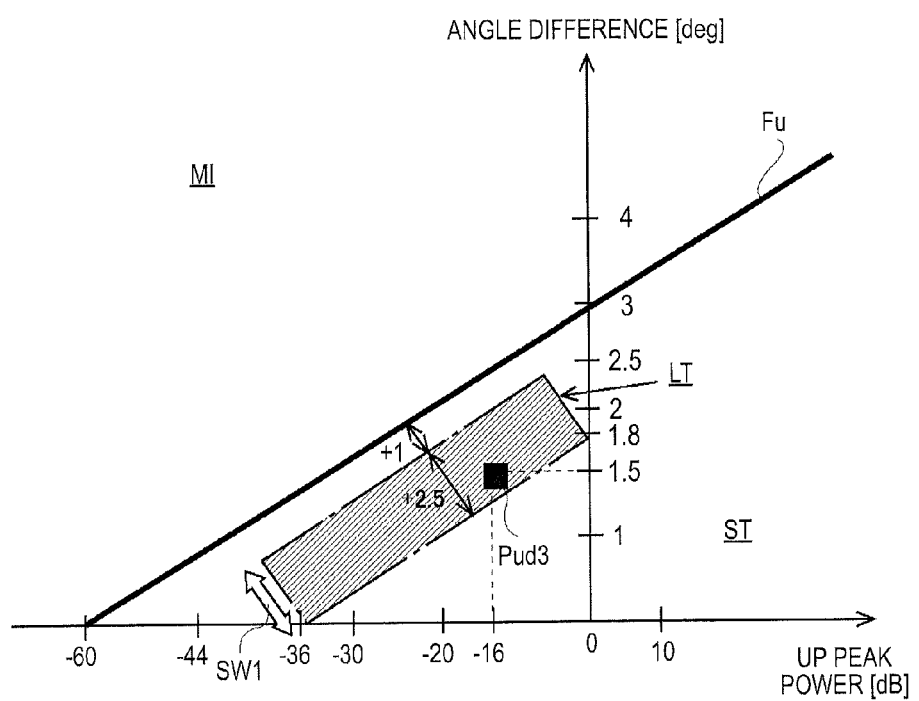
FIG. 22 is a diagram for describing one example of setting a range of a low-reliability region.

Then, the signal processing unit 17 sets the low-reliability region having the range according to the parameter value of the normal-paired data Pud3. FIG. 22 is a diagram for describing one example of setting the range of the low-reliability region. The signal processing unit 17 sets the low-reliability region LT having a given region near the boundary line Fu according to the peak power of the up period and the peak power of the down period which are parameters of the normal-paired data Pud3. Herein, supposing that the peak power of the up period of the normal-paired data Pud3 is −16 dB from a value of the horizontal axis of the graph, and the peak power of the down period is −34 dB, for example, the average peak power is −25 dB. The signal processing unit 17 reads the range of the low-reliability region corresponding to the average peak power −25 dB from the region data 172b, and sets the rectangular low-reliability region LT having the width of +1 or more and less than +2.5 when the boundary line Fu is set to ±0. The width of the low-reliability region LT corresponding to the short side of the rectangular region is set to a width as much as the absolute value 1.5 of the discrimination score, as illustrated in the region width SW1. Further, the long side of the rectangular region has a predetermined length, for example, a length including an angular difference of 0 degree or more in the range (e.g., from −60 dB to 0 dB) from which the value of peak power is actually derived.

Since the normal-paired data Pud3 is contained in the range of the low-reliability region LT by the setting of the low-reliability region LT, the signal processing unit 17 changes the output condition of the target information of the normal-paired data Pud3. For example, if there are three continuities including up to two extrapolation processes, the signal processing unit 17 changes a condition (hereinafter referred to as a first condition) to output the target information to the vehicle control device 2 to a condition (hereinafter referred to as a second condition) in which there are three continuities with no extrapolation process. That is, only in a case where there is the continuity (first process ○→second process ○→third process ○) of the judgment process in the first to third target deriving processes, the signal processing unit 17 changes the condition to output the target information to the vehicle control device 2. In this way, it is possible to suppress the output of the target information which is paired in the wrong combination, and to early output the target information which is paired in the correct combination.

Further, by setting the low-reliability region LT having the range corresponding to the parameter value of the normal-paired data, it is possible to set the range of the low-reliability region according to the reliability in the combination of the peak signal of the up period and the peak signal of the down period of the normal-paired data.

Changing the output condition of the target information to the vehicle control device 2 from the first condition to the second condition by the signal processing unit 17 corresponds to that the output condition is set to the following condition. In the case where the normal-paired data Pud3 is included in the range of the low-reliability region LT, it corresponds to the condition to delay the output to the vehicle control device 2 than when the normal-paired data Pud3 is out of the range of the low-reliability region LT (e.g., this is a case where the coordinate position of the normal-paired data Pud3 becomes a position of upper peak power of 0 dB and angle of 1 degree, and is further away from the boundary line Fu than the current position Pud3).

In the case where the output condition is the second condition, when there is no continuity in the third object deriving process (third process x), the target information based on the normal-paired data Pud3 is not output to the vehicle control device 2 even though there is the continuity in the fourth judgment process (fourth process ○). As a result, the output of the target information to the vehicle control device 2 is limited to the case (fourth process ○→fifth process ○→sixth process ○) where there is the continuity in the fifth and sixth target deriving processes at earliest. Therefore, the precision of the radar apparatus 1 to judge the true/false of the normal-paired data having the possibility of pairing the data in the wrong combination is improved.

The signal processing unit 17 makes the region width of the low-reliability region narrow as the average peak power of the normal-paired data is large, as illustrated and described in the data of the region data 172b in FIG. 20. In this way, the process can be performed without including the normal-paired data having the high reliability of the pairing of the normal-paired data in the range of the low-reliability region. For example, if there is specifically no paired data Pud2 and paired data Pud3 in FIG. 21, in other words, if there are only the paired data Pud1 and Pud4 in which the paired data exists in the wrong region MI, the signal processing unit 17 selects the paired data Pud1 (−1.3) having the discrimination score higher than the paired data Pud4 (−3.2), as the normal-paired data.

Figure 23:
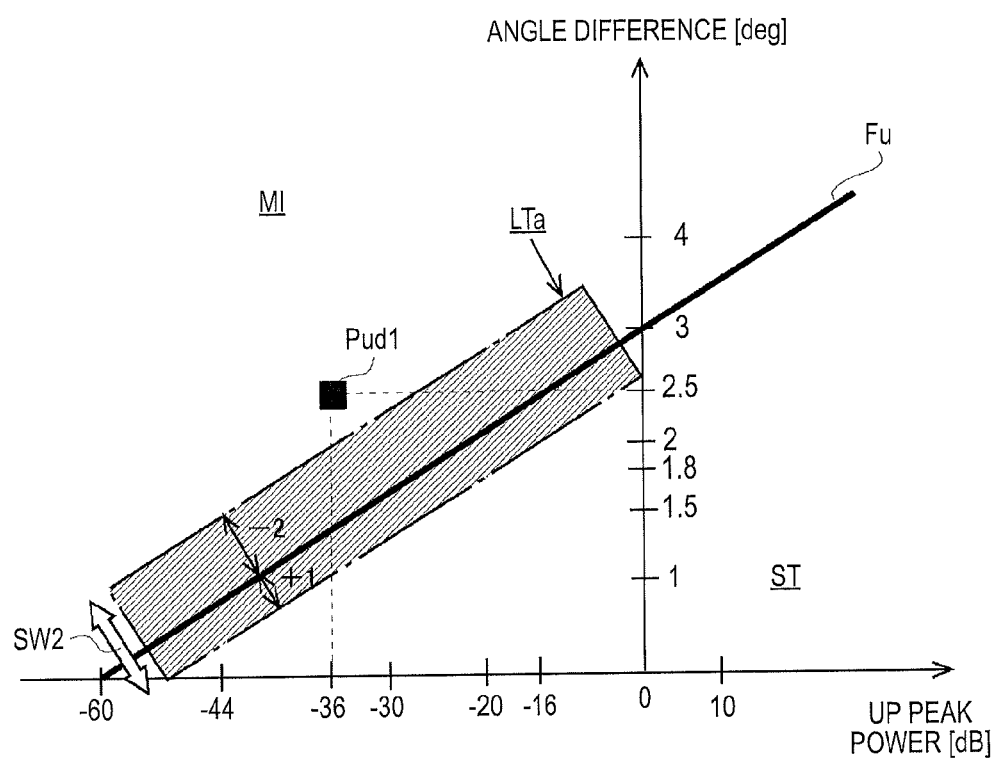
FIG. 23 is a diagram for describing another example of setting a range of a low-reliability region.

If the paired data Pud1 is selected as the normal-paired data, as illustrated in FIG. 23, the signal processing unit 17 sets the low-reliability region LTa having the predetermined region near the boundary line Fu according to the peak power of the up period and the peak power of the down period which are parameters of the normal-paired data Pud1.

FIG. 23 is a diagram for describing another example of setting the range of the low-reliability region. Herein, supposing that the peak power of the up period of the normal-paired data Pud3 is −36 dB from a value of the horizontal axis of the graph, and the peak power of the down period is −37 dB, the average peak power is −37 dB. The signal processing unit 17 reads the range of the low-reliability region corresponding to the average peak power −37 dB from the region data 172b, and sets the rectangular low-reliability region LTa having the width of −2 or more and less than +1 when the boundary line Fu is set to ±0. The width of the low-reliability region LTa corresponding to the short side of the rectangular region is set to a width as much as the absolute value 3.0 of the discrimination score, as illustrated in the region width SW2. Further, the long side of the rectangular region has a predetermined length, for example, a length including an angular difference of 0 degree or more in the range (e.g., from −60 dB to 0 dB) from which the value of peak power is actually derived.

The rectangular region of the low-reliability region LT and the low-reliability region LTa has been described as one example of a shape in a two-dimensional region of which the horizontal axis is the up peak power, and the vertical axis is the angular difference. Herein, since the discrimination function is derived from the plurality of parameter values (e.g., 7 parameters) including the up peak power and the angular difference, the low-reliability region is actually set in a region of two or more dimensions, that is, multi-dimensions (e.g., 7-dimensions). Further, even in the case where the low-reliability region is set in multi-dimensions, the low-reliability region is set, similar to the two-dimensional region. That is, similar to that the long side of the rectangular region at the time of two-dimensions illustrated in the example of FIGS. 22 and 23 is set based on a plurality (two) of parameter values, and the short side is set based on the discrimination score when the boundary (boundary line Fu) is set to ±0, the range of the low-reliability region is set on the basis of the discrimination score based on the plurality of parameter values and the boundary, even in the case of the multi-dimensions.

Since the normal-paired data Pud1 is not included in the range of the low-reliability region LTa by the setting of the low-reliability region LTa, the signal processing unit 17 does not change the output condition of the target information based on the normal-paired data Pud1. That is, the signal processing unit 17 outputs the target information of the normal-paired data Pud1 to the vehicle control device 2 based on the first condition. In other words, the signal processing unit 17 outputs the target information to the vehicle control device 2 without changing the output condition.

In the case where the low-reliability region LTa is compared with the low-reliability region LT, as the average peak power of the normal-paired data is large (e.g., average peak power −37 dB (region LTa)<−25 dB (region LT)), the region width of the low-reliability region becomes narrow (region width 3.0 (region LTa)> region width 1.5 (region LT)). As a result, as the average peak power of the normal-paired data is large, the range of the low-reliability region becomes also narrow.

9. Processing Flowchart

<9-1. Pairing Process>

Figure 24:
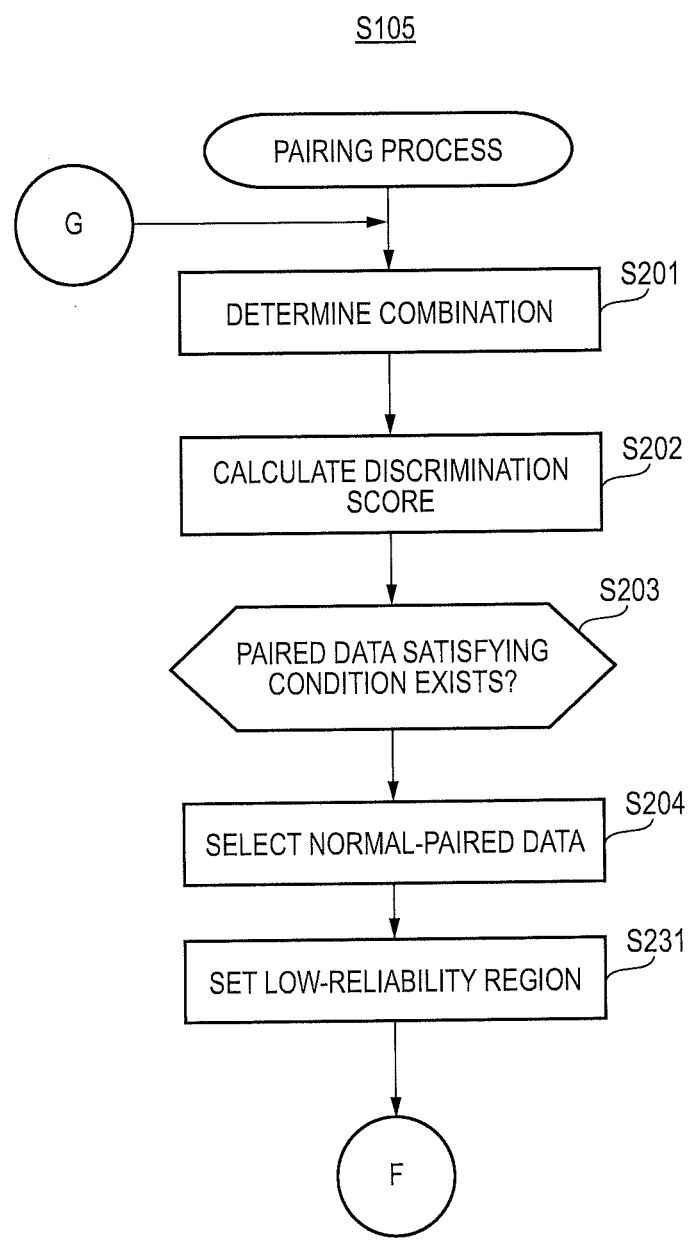
FIG. 24 is a flowchart illustrating a pairing process according to a fourth embodiment.
Figure 25:
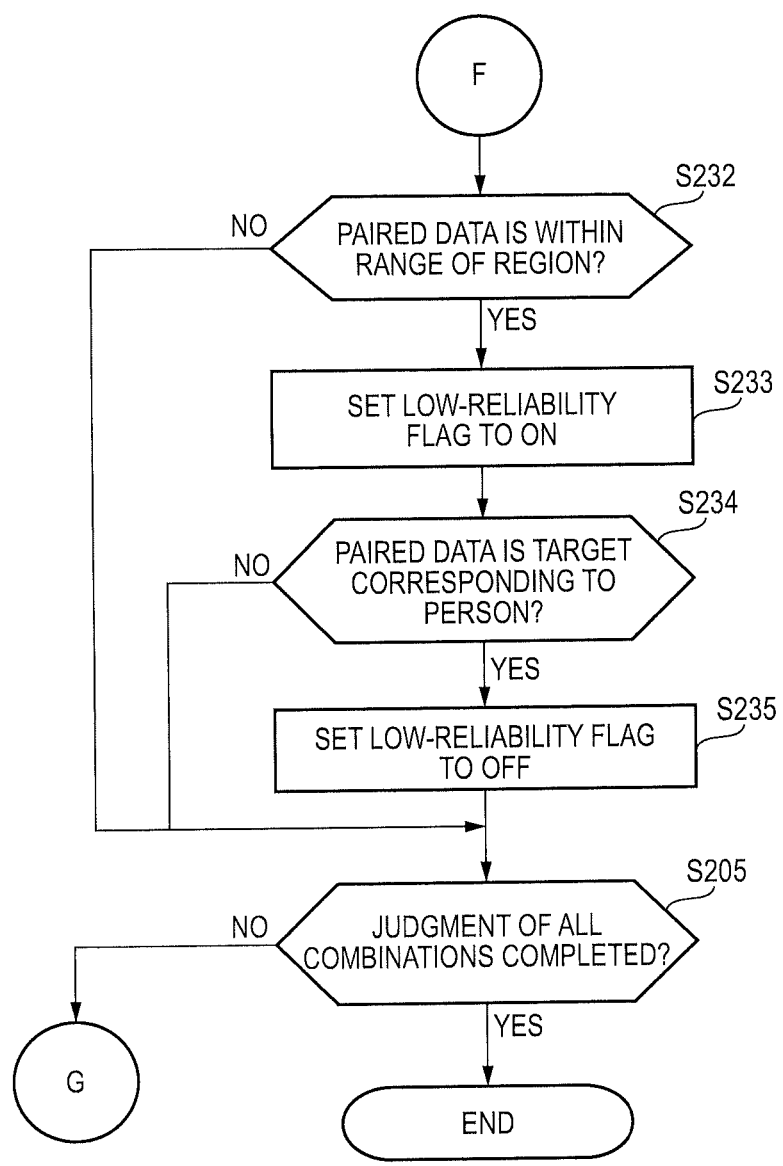
FIG. 25 is a flowchart illustrating a pairing process according to the fourth embodiment.

Next, the pairing process according to the fourth embodiment will be described with reference to FIGS. 24 and 25. FIGS. 24 and 25 are flowcharts illustrating the pairing process according to the fourth embodiment. The processing flowchart of FIG. 24 has steps S231 to S235 which are added to the processing flowchart of FIG. 10 which has been described in the first embodiment.

If the paired data satisfying the condition (paired data having the highest positive discrimination score) of the normal-paired data exists (Yes in step S203), the signal processing unit 17 selects the paired data satisfying the above condition as the normal-paired data (step S204).

Then, the signal processing unit 17 sets the low-reliability region having the range according to the parameter value of the normal-paired data (e.g., normal-paired data Pud3) (step S231). Specifically, the signal processing unit 17 sets the low-reliability region having a given region near the boundary line Fu according to the peak power of the up period and the peak power of the down period which are parameters of the normal-paired data.

If the normal-paired data is within the range of the low-reliability region (Yes in step S232 illustrated in FIG. 25), the signal processing unit 17 sets a low-reliability flag to on, the flag indicating the data of which the normal-paired data is within the low-reliability region (step S233) to perform the process of step S234. Meanwhile, if the normal-paired data is out of the range of the low-reliability region (No in step S232), the signal processing unit 17 judges whether or not the process of selecting the normal-paired data is completed for all combinations of the peak signals of the up period and the peak signals of the down period (step S205).

Herein, the phrase "the normal-paired data is out of the range of the low-reliability region" means that in the case where the normal-paired data is in the normal region ST, the coordinate position of the normal-paired data is located at the position spaced apart from the boundary line Fu than the low-reliability region provided in the normal region ST. If the coordinate position of the normal-paired data is located at the position spaced apart from the boundary line Fu than the low-reliability region, since the peak power of the up period and the down period of the normal-paired data is relatively increased, it can be processed as the pair data which is paired in the correct combination.

Returning back to the process of step S234, the signal processing unit 17 judges whether or not the normal-paired data is paired data of the target corresponding to a person (step S234). Herein, the phrase "target corresponding to the person" means, for example, a target corresponding to a stationary object derived when peak signals are paired based on the reflection wave from the person such as a pedestrian, and a target having a speed as much as a walking speed of the person.

If the paired data is the paired data of the target corresponding to the person (Yes in step S234), the signal processing unit 17 changes the low-reliability flag of the normal-paired data from the on state to the off state (step S235). Under ordinary circumstances, for the normal-paired data within the range of the low-reliability region, since the output condition is changed from the first condition to the second condition, the output of the target information to the vehicle control device 2 is relatively delayed. However, in the case of the target corresponding to the person, the signal processing unit 17 performs the process of outputting the target information based on the first condition, without changing the output condition. Therefore, the radar apparatus 1 can early output the target information on the target corresponding to the person to the vehicle control device 2.

<9-2. Judgment Process>

Figure 26:
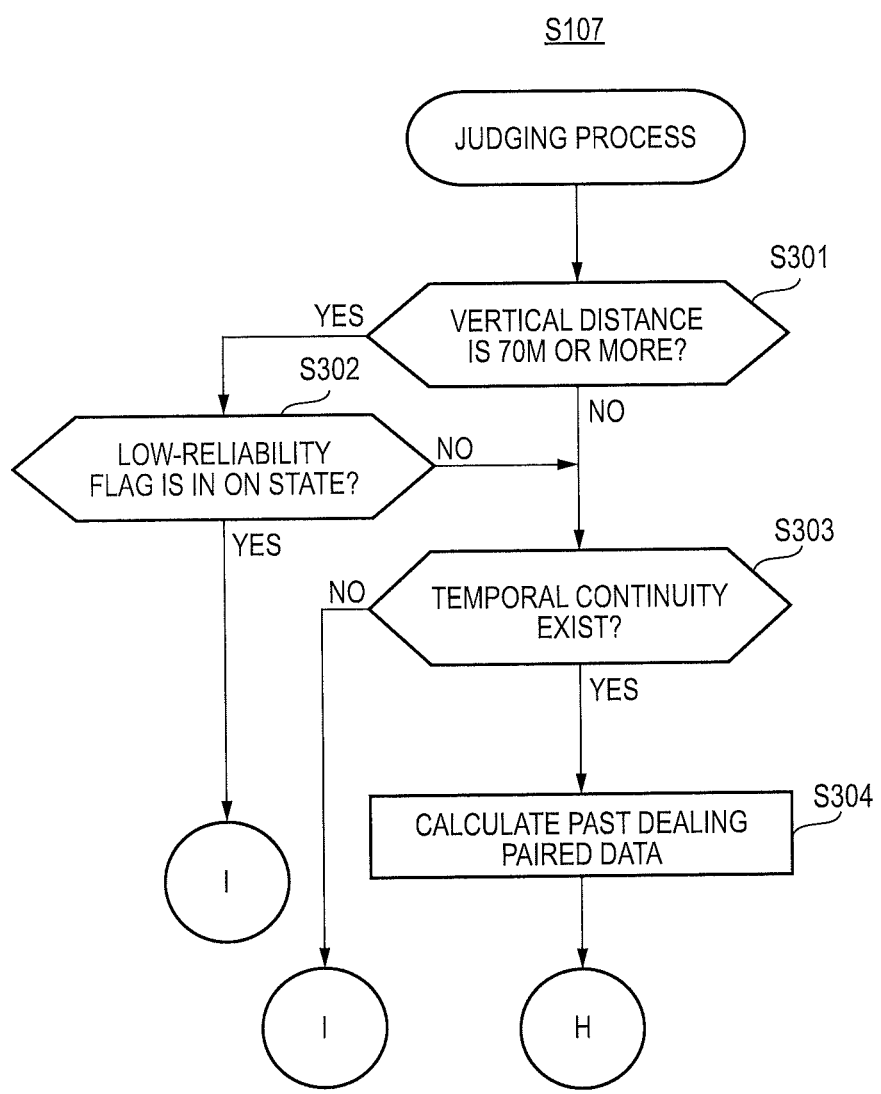
FIG. 26 is a flowchart illustrating a judgment process according to the fourth embodiment.
Figure 27:
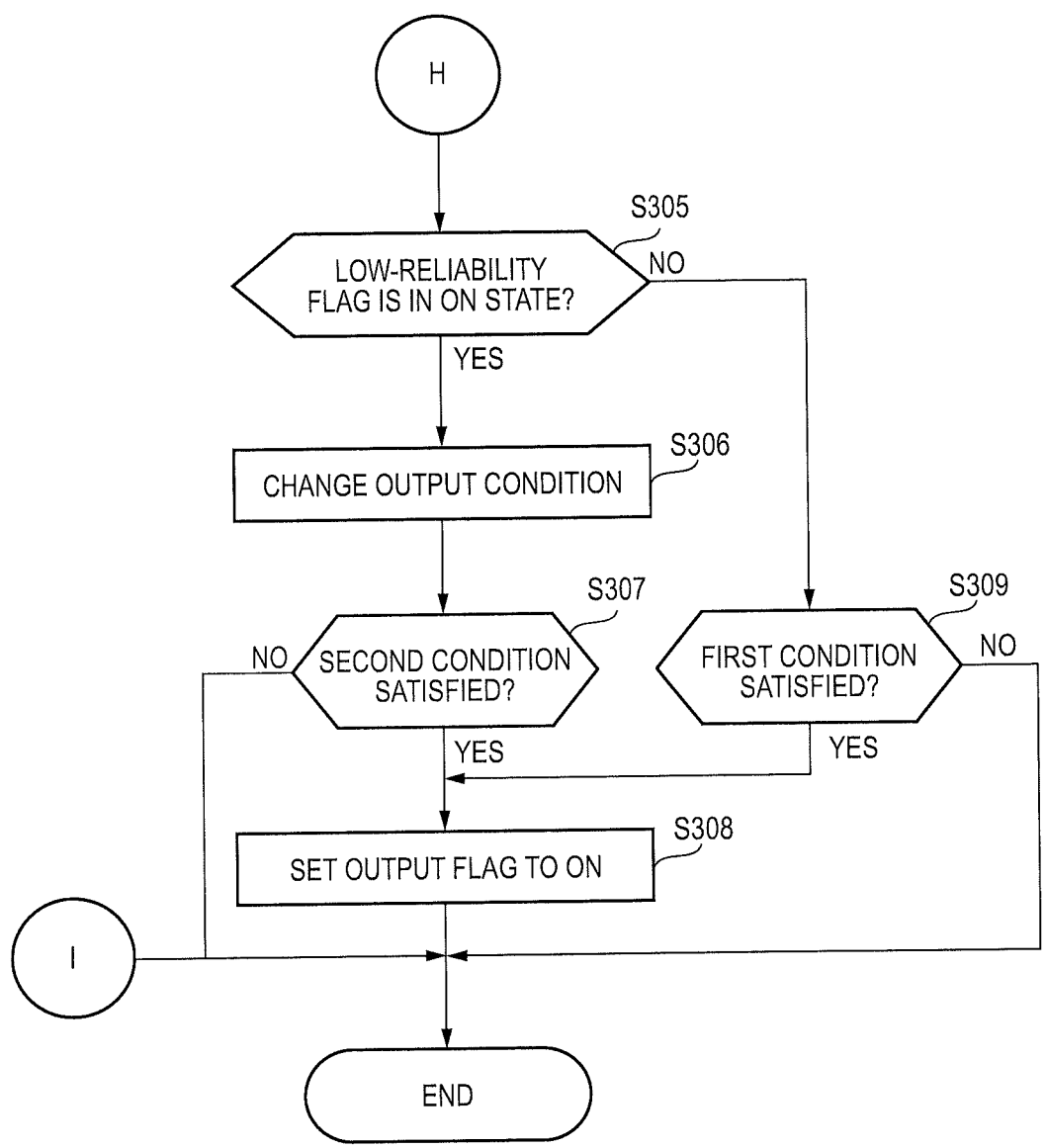
FIG. 27 is a flowchart illustrating a judgment process according to the fourth embodiment.

Next, the process of judging the continuity of the target information according to the fourth embodiment will now be described with reference to FIGS. 26 and 27. FIGS. 26 and 27 are flowcharts illustrating the judgment process according to the fourth embodiment. The signal processing unit 17 judges whether or not the vertical distance of the normal-paired data (e.g., normal-paired data Pud3) is equal to or greater than a predetermined distance (e.g., 70 m or more). If the vertical distance of the normal-paired data is 70 m or more (Yes in step S301), the signal processing unit 17 judges whether or not the low-reliability flag of the normal-paired data is in the on state (step S302).

If the low-reliability flag of the normal-paired data is in the on state (Yes in step S302), the normal-paired data becomes a new paired data. The normal-paired data, of which the low-reliability flag spaced apart by a given distance is in the on state, is not to be judged, even though the normal-paired data of the same object is derived in the next target deriving process. That is, the presence or absence of the continuity is not judged. As a result, the target information of the normal-paired data is not output to the vehicle control device 2. In this way, the radar apparatus 1 can decrease the processing load, without performing the process of the target, by which the output is not necessary. Meanwhile, if the low-reliability flag of the normal-paired data is in the off state (No in step S302), the signal processing unit 17 performs the process of step S303.

As described above, in the case of either of the vertical distance of the normal-paired data is not 70 m or more (No in step S301), or the low-reliability flag of the normal-paired data is in the off state (No in step S302), the process of step S303 is performed.

If there is a temporally consecutive relation between the normal-paired data and the predicted paired data predicting the normal-paired data from the target information derived by the previous target driving process (Yes in step S303), the signal processing unit 17 derives past dealing data which is filtered from the normal-paired data and the predicted paired data (step S304).

Then, the signal processing unit 17 judges whether or not the low-reliability flag of the normal-paired data corresponding to the past dealing paired data is in the on state (step S305 illustrated in FIG. 27). If the low-reliability flag of the normal-paired data is in the on state (Yes in step S305), the signal processing unit 17 changes the output condition of the target information of the normal-paired data from the first condition to the second condition (step S306).

If the normal-paired data satisfies the second condition (Yes in step S307), the signal processing unit 17 changes the output flag of the target information of the normal-paired data in the on state (step S308). If the normal-paired data does not satisfy the second condition (No in step S307), the process is terminated. In this way, it is possible to suppress the output of the target information which is paired in the wrong combination, and to early output the target information which is paired in the correct combination.

Returning back to step S305, if the low-reliability flag of the normal-paired data is in the off state (No in step S305), the signal processing unit 17 judges whether the normal-paired data satisfies the first condition (step S309). If the normal-paired data satisfies the first condition (Yes in step S309), the output flag of the target information of the normal-paired data is changed in the on state (step S308). Meanwhile, if the normal-paired data does not satisfy the first condition (No in step S309), the process is terminated.

Modified Examples

Hereinbefore, the embodiments of the present invention have been described. However, the present invention is not limited to those embodiments, and various modified examples may be made. Hereinafter, such modified examples will be described. On the other hand, all forms, including forms described in the above-described embodiments and forms to be described hereinafter, can be appropriately combined.

In the above embodiments, the discrimination function, the discrimination score, and the values added to/subtracted from the discrimination score are one example, and other values except for the values mentioned in the embodiments may be used.

In the above embodiments, the boundary line Fu indicating the boundary between the normal-paired data indicated by the circular marks and the mis-paired data by the triangular marks which are illustrated in the lower drawing in FIG. 6 is provided to divide all data of the normal-paired data and the mis-paired data. In addition, as illustrated in the upper drawing in FIG. 7, the region between the normal region ST and the wrong region MI is provided by the boundary line Fu. Even in the case where a part of one region exists in the other region, the boundary line Fu may be provided to divide each region when being divided into the respective regions to which the data accounting for a given ratio or more (e.g., above 90%) respectively belongs to the respective regions (normal region ST and wrong region MI). That is, a part of the mis-paired data indicated by the triangular marks may be included in the normal region ST divided by the boundary line Fu, or a part of the normal-paired data indicated by the circular marks may be included in the wrong region MI.

In the above embodiments, the description has been given that the images pictured by the camera 42 are input to the vehicle control device 2, and the vehicle control device 2 derives the information on the object image such as the position or relative speed of the object. However, the derivation of the information on the object image may be performed by the signal processing unit 17 of the radar apparatus 1. That is, the image pictured by the camera 42 may be input to the signal processing unit 17, and the signal processing unit 17 may recognize the object image, thereby deriving a vertical distance (traveling direction) or a horizontal distance of the vehicle which is a rear object corresponding to the object image.

In the above embodiments, the description has been given that the vehicle control device 2 outputting the target information is configured differently from the radar apparatus 1. However, the vehicle control device 2 may be configured to be included in the radar apparatus 1. Even in the case where the vehicle control device 2 is included in the radar apparatus 1, the target information is output from the radar apparatus 1 to the vehicle control device 2.

In the above embodiments, the vehicle control device 2 has been described, for example, to perform the control of PCS. However, the vehicle control device 2 may perform other control. For example, the vehicle control device may control so that the vehicle CR travels to follow up the preceding vehicle which drives ahead the vehicle CR within a traffic lane along which the vehicle CR drives. Specifically, the vehicle control device 2 may control at least one of the brake 50 and the throttle 51 according to the traveling of the vehicle CR to perform ACC (Adaptive Cruise Control) which is a control of driving the vehicle CR to follow up the preceding vehicle in a state in which a given inter-vehicular distance between the vehicle CR and the preceding vehicle is retained. In the case where the control contents of the vehicle CR are changed, the condition is changed in the judgment process of the target information according to the fourth embodiment. For example, the vertical distance of step S301 illustrated in FIG. 26 is changed from 70 m or more to 150 m or more.

In the above embodiments, the detailed condition of the first condition and the second condition which are the output condition is merely one example, and other condition may be employed. That is, the first condition may be a condition where the target information having a given continuity is early output to the vehicle control device 2. Further, the second condition described in the fourth embodiment may be a condition where outputting of the target information to the vehicle control device 2 is delayed than the first condition to improve the precision in true/false of the combination of the paired data.

In the fourth embodiment, for the range of the low-reliability region, one example of the range of the region corresponding to the average peak power has been described with reference to FIG. 20 or the like. The range of the low-reliability region may be a range corresponding to the average peak power.

In the above embodiments, the angular direction estimation of the radar apparatus 1 has been described as the ESPRIT, but may use any one of algorithms such as DBF (Digital Beam Forming), PRISM (Propagator method based on an Improved Spatial-smoothing Matrix), and MUSIC (Multiple Signal Classification).

Further, in the above embodiments, the radar apparatus 1 may be used for various applications (e.g., at least any one of monitoring flying airplanes and sailing vessels).

What is claimed is:

1. A radar apparatus for outputting target information with respect to a target to a vehicle control device comprising:
   a signal generating unit configured to generate a transmitting signal;
   a transmission antenna configured to output a continuous transmission wave corresponding to the transmitting signal;
   a reception antenna configured to receive a reflection wave, the reflection wave being a reflection of the continuous transmission wave reflected off an object;
   an extracting unit configured to extract a peak signal obtained from a difference frequency between the transmitting signal of which a frequency is changed in a predetermined period, and a receiving signal obtained by receiving the reflection wave at which the transmission wave based on the transmitting signal is reflected from the object, during a first period in which the frequency of the transmitting signal ascends and a second period in which the frequency descends;
   a pairing unit configured to pair the peak signal of the first period and the peak signal of the second period based on a predetermined condition;
   a deriving unit configured to derive target information including a position of the target based on paired data obtained by pairing the peak signals; and
   an output unit configured to output the target information to the vehicle control device,
   wherein the pairing unit selects normal-paired data which is paired in a correct combination, from among the plurality of paired data, based on a plurality of parameter values of the peak signal of the first period and the peak signal of the second period which are to be paired, and a discrimination function for discriminating true/false of the pairing,
   wherein the pairing unit selects the normal-paired data from among the plurality of paired data, using information on presence or absence of a past consecutive target which is a target having a temporally consecutive relation with paired data of a recent process having information on a discrimination result using the discrimination function, among the targets derived by the past process temporally consecutive with the recent process
   wherein the pairing unit calculates the discrimination score indicative of the degree of true/false of the pairing of the paired data based on the plurality of parameter values and the discrimination function, and selects the normal-paired data from among the plurality of paired data using, information on whether the past consecutive target exists, in a case where the discrimination score of the paired data is within a predetermined score range.

2. The radar apparatus according to claim 1, wherein the pairing unit adds to the discrimination score of the paired data in which the past consecutive target exists, a predetermined value.

3. The radar apparatus according to claim 1, wherein the pairing unit subtracts from the discrimination score of the paired data in which the past consecutive target does not exist, a predetermined value, or uses the discrimination score without being changed.

4. A radar apparatus for outputting target information with respect to a target to a vehicle control device comprising:
   a signal generating unit configured to generate a transmitting signal;
   a transmission antenna configured to output a continuous transmission wave corresponding to the transmitting signal;
   a reception antenna configured to receive a reflection wave, the reflection wave being a reflection of the continuous transmission wave reflected off an object;
   an extracting unit configured to extract a peak signal obtained from a difference frequency between the transmitting signal of which a frequency is changed in a predetermined period, and a receiving signal obtained by receiving the reflection wave at which the transmission wave based on the transmitting signal is reflected from the object, during a first period in which the frequency of the transmitting signal ascends and a second period in which the frequency descends;
   a pairing unit configured to pair the peak signal of the first period and the peak signal of the second period based on a predetermined condition;
   a deriving unit configured to derive target information including a position of the target based on paired data obtained by pairing the peak signals; and
   an output unit configured to output the target information to the vehicle control device,
   wherein the pairing unit selects normal-paired data which is paired in a correct combination, from among the plurality of paired data, based on a plurality of parameter values of the peak signal of the first period and the peak signal of the second period which are to be paired, and a discrimination function for discriminating true/false of the pairing,
   wherein the pairing unit selects the normal-paired data from among the plurality of paired data, using information on presence or absence of an object image which is an image of an object corresponding to the paired data having information of discrimination result using the discrimination function, among images pictured by a camera,
   wherein the pairing unit calculates a discrimination score indicative of the degree of true/false of the pairing of the paired data based on the plurality of parameter values and the discrimination function, and selects the normal-paired data from among the plurality of paired data, using information on presence or absence of the object image, if the discrimination score of the paired data is within the predetermined score range.

5. The radar apparatus according to claim 4, wherein the pairing unit adds to the discrimination score of the paired data in which the object image exists, a predetermined value.

6. The radar apparatus according to claim 4, wherein the pairing unit subtracts from the discrimination score of the paired data in which the object image does not exist, a predetermined value, or uses the discrimination score without being changed.

7. A radar apparatus for outputting target information with respect to a target to a vehicle control device comprising:
   a signal generating unit configured to generate a transmitting signal;
   a transmission antenna configured to output a continuous transmission wave corresponding to the transmitting signal;
   a reception antenna configured to receive a reflection wave, the reflection wave being a reflection of the continuous transmission wave reflected off an object;
   an extracting unit configured to extract a peak signal obtained from a difference frequency between the transmitting signal of which a frequency is changed in a predetermined period, and a receiving signal obtained by receiving the reflection wave at which the transmission wave based on the transmitting signal is reflected from the object, during a first period in which the frequency of the transmitting signal ascends and a second period in which the frequency descends;

a pairing unit configured to pair the peak signal of the first period and the peak signal of the second period based on a predetermined condition;

a deriving unit configured to derive target information including a position of a target based on paired data obtained by pairing the peak signals;

an output unit configured to output the target information to the vehicle control device based on an output condition;

a region setting unit configured to set a low-reliability region having a predetermined range near a boundary to discriminate true/false of a combination of the paired data; and a change unit configured to change the output condition if the normal-paired data is included in the range of the low-reliability region, wherein the pairing unit selects normal-paired data which is paired in a correct combination, from among the plurality of paired data, based on a plurality of parameter values of the peak signal of the first period and the peak signal of the second period which are to be paired, and a discrimination function for discriminating true/false of the pairing.

8. The radar apparatus according to claim 7, wherein the region setting unit sets the low-reliability region having a range according to a parameter value of the normal-paired data.

9. The radar apparatus according to claim 8, wherein the region setting unit makes the range of the low-reliability region narrow as power of the peak signal of the normal-paired data is large.

10. The radar apparatus according to claim 7, wherein the change unit does not change the output condition if the normal-paired data included in the range of the low-reliability region is paired data of a target corresponding to a person.

11. The radar apparatus according to claim 7, wherein the output unit does not output the target information if a vertical distance of the normal-paired data included in the low-reliability region is equal to or greater than a predetermined distance.

12. The radar apparatus according to claim 7, wherein the change unit sets the output condition, in the case where the normal-paired data is included in the range of the low-reliability region, to a condition to delay an output than when the normal-paired data is out of the range of the low-reliability region.

13. A signal processing method for outputting target information with respect to a target to a vehicle control device comprising:

(a) generate a transmitting signal using a signal generating unit;

(b) output a continuous transmitting wave corresponding to the transmitting signal through a transmission antenna;

(c) receive at a reception antenna a the reflection wave being a reflection of the continuous transmission wave reflected off an object;

(d) extracting a peak signal obtained from a difference frequency between the transmitting signal of which a frequency is changed in a predetermined period, and a receiving signal obtained by receiving the reflection wave at which the transmission wave based on the transmitting signal is reflected from the object, during a first period in which a frequency of the transmitting signal ascends and a second period in which the frequency descends;

(e) pairing the peak signal of the first period and the peak signal of the second period based on a predetermined condition; and (f) deriving the target information including a position of the target based on paired data obtained by pairing the peak signals, (g) outputting the target information to the vehicle control device, wherein in the step (e), normal-paired data which is paired in a correct combination is selected from among the plurality of paired data, based on a plurality of parameter values of the peak signal of the first period and the peak signal of the second period which are to be paired, and a discrimination function for discriminating true/false of the pairing, wherein in the step (e), normal-paired data is selected from among the plurality of paired data, using information on presence or absence of a past consecutive target which is a target having a temporally consecutive relation with paired data of a recent process having information on a discrimination result using the discrimination function, among the targets derived by the past process temporally consecutive with the recent process wherein in the step (e), discrimination score indicative of the degree of true/false of the pairing of the paired data is calculated based on the plurality of parameter values and the discrimination function, and the normal-paired data is selected from among the plurality of paired data using, information on whether the past consecutive target exists, in a case where the discrimination score of the paired data is within a predetermined score range.

* * * * *